(12) United States Patent
Wåreus

(10) Patent No.: US 12,339,972 B2
(45) Date of Patent: Jun. 24, 2025

(54) METHOD FOR LINKING A CVE WITH AT LEAST ONE SYNTHETIC CPE

(71) Applicant: debricked AB, Malmö (SE)

(72) Inventor: Carl Emil Orm Wåreus, Malmo (SE)

(73) Assignee: DEBRICKED AB (SE)

( * ) Notice: Subject to any disclaimer, the term of this patent is extended or adjusted under 35 U.S.C. 154(b) by 135 days.

(21) Appl. No.: 17/759,968

(22) PCT Filed: Feb. 12, 2021

(86) PCT No.: PCT/EP2021/053487
§ 371 (c)(1),
(2) Date: Aug. 2, 2022

(87) PCT Pub. No.: WO2021/160822
PCT Pub. Date: Aug. 19, 2021

(65) Prior Publication Data
US 2023/0075290 A1 Mar. 9, 2023

(30) Foreign Application Priority Data

Feb. 14, 2020 (SE) .................................... 2050166-4
Mar. 19, 2020 (SE) .................................... 2050302-5

(51) Int. Cl.
*G06F 21/57* (2013.01)
(52) U.S. Cl.
CPC ...... *G06F 21/577* (2013.01); *G06F 2221/034* (2013.01)
(58) Field of Classification Search
CPC ............. G06F 21/577; G06F 2221/034; H04L 63/1433

(Continued)

(56) References Cited

U.S. PATENT DOCUMENTS

| 11,599,826 | B2 * | 3/2023 | Khurana ................. G06N 20/00 |
| 2017/0220806 | A1 * | 8/2017 | Munoz .................. G06F 21/577 |

(Continued)

FOREIGN PATENT DOCUMENTS

| KR | 101859562 B1 * | 5/2018 |
| KR | 101 893 090 B1 | 8/2018 |
| KR | 1020200056627 | * 5/2020 |

OTHER PUBLICATIONS

Automated Characterization of Software Vulnerabilities Danielle Gonzalez, Holly Hastings, Mehdi Mirakhorli Rochester Institute of Technology, Rochester, NY (Year: 2019).*
Automated Keyword Extraction from "One-day" Vulnerabilities at Disclosure Clément Elbaz, Louis Rilling, Christine Morin (Year: 2019).*

(Continued)

*Primary Examiner* — Shin-Hon (Eric) Chen
*Assistant Examiner* — Pegah Barzegar
(74) *Attorney, Agent, or Firm* — Sheridan Ross P.C.

(57) ABSTRACT

A method (300) for linking a common vulnerability and exposure, CVE, (106) with at least one synthetic common platform enumeration, CPE, (112) wherein the CVE (106) comprises a summary of a vulnerability, is disclosed. The method (300) comprising: receiving (S302) the summary of the CVE (106) from a vulnerability database, VD, (104); extracting (S304) information from the summary of the CVE (106) using a Natural Language Processing, NLP, model; building (S306) at least one synthetic CPE (112) based on the extracted information; and linking (S308) the CVE (106) with the at least one synthetic CPE (112).

20 Claims, 11 Drawing Sheets

(58) Field of Classification Search
USPC .......................................................... 726/25
See application file for complete search history.

(56) References Cited

U.S. PATENT DOCUMENTS

| | | | | |
|---|---|---|---|---|
| 2018/0300637 A1* | 10/2018 | Yan | ................. | G06N 20/00 |
| 2019/0147167 A1* | 5/2019 | Kim | ................. | G06F 40/143 |
| | | | | 726/25 |
| 2020/0050667 A1* | 2/2020 | Lin | ................. | G06F 16/35 |
| 2020/0137103 A1* | 4/2020 | Ngo | ................. | G06F 40/20 |
| 2020/0251097 A1* | 8/2020 | Hu | ................. | G10L 25/48 |
| 2021/0248321 A1* | 8/2021 | Cheng | ................. | G06F 16/954 |
| 2023/0075290 A1* | 3/2023 | Wåreus | ................. | G06F 21/577 |

OTHER PUBLICATIONS

International Search Report and Written Opinion mailed Apr. 23, 2021, issued in corresponding International Patent Application No. PCT/EP2021/053487, filed Feb. 12, 2021, 14 pages.

Sanguino, L.A.B., et al. "Software Vulnerability Analysis Using CPE and CVE", retrieved from <https://arxiv.org/abs/1705.05347> arxiv.org, Cornell University Library, May 2017, 29 pages.

O'Hare, J., et al., "Identifying Vulnerabilities Using Internet-Wide Scanning Data", 2019 IEEE 12th International Conference on Global Security, Safety and Sustainability (ICGS3), IEEE, Jan. 16, 2019, 10 pages.

Li, Z., et al., "SySeVR: A Framework for Using Deep Learning to Detect Software Vulnerabilities" IEEE Transactions on Dependable and Secure Computing, vol. 19, Issue 4, Jul.-Aug. 2022, pp. 2244-2258, retrieved from <https://arxiv.org/pdf/1807.06756>.

Li, Z., et al., "VulDeePecker: A Deep Learning-Based System for Vulnerability Detection", Network and Distributed Systems Security (NDSS) Symposium 2018, Feb. 18-21, 2018, San Diego, CA, retrieved from <https://arxiv.org/abs/1801.01681>, 15 pages.

Ma, X., et al., "End-to-end Sequence Labeling via Bi-directional LSTM-CNNs-CRF", Proceedings of the 54th Annual Meeting of the Association for Computational Linguistics (vol. 1: Long Papers), Berlin, Germany, Association for Computational Linguistics, Aug. 7-12, 2016, pp. 1064-1074, retrieved from <https://arxiv.org/abs/1603.01354?context=cs>.

* cited by examiner

| Case | Property |
|---|---|
| Numeric | Integer fraction = 1.0 |
| Mostly Numeric | Integer fraction > 0.5 |
| Contains Numeric | Integer fraction ≤ 0.5 |
| All Lower | All lower case |
| All Upper | All upper case |
| Initial Upper | First character upper case |
| Default | All other cases |

Fig. 4

| Feature | Number of entries |
|---|---|
| Product | 8513 |
| Vendor | 3097 |
| Product and Vendor | 1005 |

Fig. 5

| Hyperparameter | Optimal value | Search space |
| --- | --- | --- |
| Learning Rate | 0.00113 | 0.0001 to 0.01 |
| LSTM cells | 305 | 100 to 400 |
| Use Casing | True | True or False |
| Use Lexicon | False | True or False |
| Word Embedding Dimension | 100 | 50, 100, 200 or 300 |
| Character Embedding Dimension | 119 | 10 to 120 |
| Dropout | 0.2106 | 0.2 to 0.8 |
| Recurrent Dropout | 0.2486 | 0.2 to 0.8 |

Fig. 8

| Model | Test set | | | Validation set | | | Training set | | |
| --- | --- | --- | --- | --- | --- | --- | --- | --- | --- |
| | F1 | precision | recall | F1 | precision | recall | F1 | precision | recall |
| Base model | 0.8499 | 0.8437 | 0.8562 | 0.8435 | 0.8379 | 0.8491 | 0.9498 | 0.9404 | 0.9595 |
| + lexicon | 0.8554 | 0.8604 | 0.8505 | 0.8493 | 0.8570 | 0.8418 | 0.9986 | 0.9983 | 0.9989 |
| + case | 0.8604 | 0.8571 | 0.8637 | 0.8533 | 0.8536 | 0.8530 | 0.9963 | 0.9952 | 0.9973 |
| + lexicon + case | 0.8574 | 0.8505 | 0.8645 | 0.8527 | 0.8482 | 0.8572 | 0.9422 | 0.9336 | 0.9510 |

Fig. 9

| Label | F1 | Recall | Precision | Prediction count | Label count |
| --- | --- | --- | --- | --- | --- |
| B-versionEndIncluding | 0.7817 | 0.7817 | 0.7817 | 875 | 875 |
| B-version | 0.8573 | 0.8618 | 0.8527 | 2655 | 2627 |
| B-versionStartIncluding | 0.7415 | 0.7238 | 0.76 | 100 | 105 |
| B-product | 0.8711 | 0.8774 | 0.8649 | 4840 | 4771 |
| O | 0.9935 | 0.9931 | 0.9938 | 184649 | 184768 |
| B-versionEndExcluding | 0.7987 | 0.7922 | 0.8053 | 303 | 308 |
| B-vendor | 0.9126 | 0.8951 | 0.9308 | 2715 | 2823 |
| I-version | 0.4396 | 0.3509 | 0.5882 | 34 | 57 |
| B-versionStartExcluding | 0 | 0 | 0 | 2 | 1 |
| I-product | 0.8549 | 0.8812 | 0.8302 | 3787 | 3568 |
| I-vendor | 0.5714 | 0.5 | 0.6667 | 111 | 148 |
| I-versionEndExcluding | 0 | 0 | 0 | 0 | 1 |
| I-versionEndIncluding | 0.2581 | 0.16 | 0.6667 | 6 | 25 |
| I-versionStartExcluding | 0 | 0 | 0 | 0 | 0 |
| I-versionStartIncluding | 0 | 0 | 0 | 0 | 0 |

Fig. 10

METHOD FOR LINKING A CVE WITH AT LEAST ONE SYNTHETIC CPE

TECHNICAL FIELD

The disclosure relates to software development and IT security in general. More particular, it is related to a method for linking a common vulnerability and exposure, CVE, with at least one synthetic common platform enumeration, CPE, by using a trained NLP model.

BACKGROUND

In almost all software development today, using open source and third-party components is crucial for its success. It is beneficial to the quality, security, functionality, and development efficiency. However, at the same time, it increases the exposure to vulnerabilities in code developed by third parties. To maintain control over the security of the developed software, the maintainers need to continuously monitor if vulnerabilities have been introduced or found in these third-party dependencies. This is commonly done with Dependency Vulnerability Management (DVM) tools that automate the process of Software Composition Analysis (SCA), and matches used software components with known vulnerabilities.

One way to monitor vulnerabilities is to collect vulnerability information about a computer system. US 2019/0147167 A1 discloses an apparatus for collecting vulnerability information of a computer system and a method thereof.

Another way is to use publicly available sources of vulnerability information. A major source of vulnerabilities is the National Vulnerability Database (NVD) [15]. These vulnerabilities have a unique Common Vulnerabilities and Exposures (CVE) identifier. The list of such identifiers is maintained by Mitre and includes a short summary of the vulnerability. In the last few years, around 30-50 new vulnerabilities have been given a CVE identifier and been recorded in NVD each day. Unfortunately, far from all CVEs maintained in the NVD database are correctly linked to CPEs. Moreover, as reported in [4], there is a notable time-lag from the first CVE disclosure to the linking of CPEs to the vulnerability. In 2018, the median time to correctly assign the CPE metadata was 35 days.

SUMMARY

National Institute of Standards and Technology (NIST) security professionals take the CVEs as they are published by Mitre and link one or more Common Platform Enumerations (CPE) [14] to each CVE. These CPEs are used to specify which software and versions are vulnerable. NIST also adds other pieces of information, such as a Common Vulnerability Scoring System (CVSS) score. While the summary, as recorded in the original identifier provided by Mitre, often includes information regarding which product and versions are affected, the list of CPEs formalizes this information and provides it in a standardized, and machine-readable, format. Thus, the CPE can be a crucial addition to the CVE information when vulnerability identification and assessment are being automated.

It is an object of the invention to at least partly overcome one or more of the above-identified limitations of the prior art. In particular, it is an object to provide methods and system for linking a common vulnerability and exposure, CVE, with at least one synthetic common platform enumeration, CPE, by using a trained NLP model.

According to a first aspect it is provided a method for linking a common vulnerability and exposure, CVE, with at least one synthetic common platform enumeration, CPE, wherein the CVE comprises a summary of a vulnerability, the method comprising:
- receiving the summary of the CVE from a vulnerability database, VD;
- extracting information from the summary of the CVE using a Natural Language Processing, NLP, model,
- building at least one synthetic CPE based on the extracted information, and
- linking the CVE with the at least one synthetic CPE.

The CVE should be interpreted as a uniquely identifiable vulnerability and information about this vulnerability.

The CPE should be interpreted as an identifier and metadata of a software. The synthetic CPE should be interpreted as an identifier on the same format as the CPE, but built by means of this invention instead of NIST security professionals.

The summary of the CVE may be unstructured text data. Unstructured may be interpreted as the text describing the vulnerability in an unrestricted way, i.e. not in following any predetermined format or being tagged in any way.

The NLP model may be context aware.

The NLP model may be configured to find Vendor, Product, Version, VersionStartExcluding, VersionStartIncluding, VersionEndExcluding and VersionEndIncluding from the CVE summaries. This data may be used to form a synthetic CPE.

The NLP model may find a multitude of synthetic CPEs in each CVE-summary. Put differently, the NLP model may extract information from a CVE summary from which a multitude of synthetic CPEs can be built.

The vulnerability database should be interpreted as a database comprising vulnerabilities, wherein each vulnerability has been assigned a CVE. As a non-limiting example, the vulnerability database can be a National Vulnerability Database, NVD. The NVD is the database used in the discussion disclosed in the detailed description. However, the database may be any database comprising vulnerabilities assigned with CVEs.

An advantage of using the disclosed method is that it is possible to build a more complete information of products, vendors and versions affected by a vulnerability in an efficient way. In addition, it is possible to link CVEs, received from the vulnerability database, to the at least one synthetic CPE automatically, i.e. in a more efficient way, instead of having to wait for the NIST security professionals to link them. This is an advantage since during the time between when a CVE is made public and it is linked with one or more CPEs software may be vulnerable to attacks. The extracted information may comprise a vendor and/or product name and/or a product version affected by the vulnerability.

The step of extracting information from the summary of the CVE may comprise:
- adding a label for each word in the summary, wherein the label is selected from a CPE relevant group comprising vendor, product, version, first excluded version, first included version, last excluded version, last included version or a non-CPE relevant group comprising none-labels, and
- extracting words with labels from the CPE relevant group.

According to one non-limiting example, the first excluded version may be a versionStartExcluding as will be further discussed in section "Data and Labels" in the detailed description. Thus, the first excluded version may indicate all vulnerable version after (excluding) a specific version.

According to one non-limiting example, the first included version may be a versionStartIncluding as will be further discussed in section "Data and Labels" in the detailed description. Thus, the first included version may indicate all vulnerable versions after (including) the specific version.

According to one non-limiting example, the last excluded version may be a VersionEndExcluding as will be further discussed in section "Data and Labels" in the detailed description. Thus, the last exluded version may indicate all vulnerable version before (excluding) this version.

According to one non-limiting example, the last included version may be a versionEndIncluding as will be further discussed in section "Data and Labels" in the detailed description. Thus, the last included version may be vulnerable version before (including) this version.

The label selected from the CPE relevant group indicates words that may be relevant in view of extracting information. Thus, these words may comprise relevant information relating to the vendor and/or product and/or the version that may be affected by the vulnerability.

The none-label in the non-CPE relevant group indicates words that may not be of relevance in view of extracting information. Thus, these words may comprise information that does not indicate anything about the vendor and/or product and/or version that may be affected by the vulnerability.

Thus, by adding labels to each word in the summary indicating whether the word is relevant in view of extracting information or not, facilitates provision of an efficient way of dividing the words of the summary in different groups and hence, extract the relevant words.

The labels from the CPE relevant group may further be labeled as B-label or I-label. The B-label may denote a labeled word to be a beginning of a word combination. The I-label may denote the labeled word to be placed after the beginning in the word combination.

Word combination should be understood as a combination of words, wherein the combination comprises two or more words. Alternatively, or in combination, a word combination may comprise only one word. As a non-limiting example, the word combination may be a product name, wherein the product name comprises two or more words.

The step of extracting information from the summary of the CVE may further comprises
  feeding, each word in the summary of the CVE into a feature engineering, wherein the feature engineering comprising Word Level Embeddings, wherein the Word Level Embeddings is configured to transform each word in the summary into a numerical vector and Character Level Embeddings, wherein the Character Level Embeddings is configured to extract character level features for each word in the summary;
  forming an input by combining outputs of the Word Level Embeddings and the Character Level Embeddings;
  feeding the input into a neural network comprising a recurrent Bidirectional Long Short-term Memory (BLSTM) network and a Conditional Random Field (CRF) layer; and
  determining a set of labeled words from output of the neural network.

Each word in the summary may simultaneously be fed into the feature engineering. Alternatively, or in combination, each word in the summary may be fed one by one into the feature engineering. Alternatively, or in combination, two or more words may be fed into the feature engineering at the same time.

Each word in the summary may be fed simultaneously into the Word Level Embeddings and the Character Level Embeddings.

Outputs from the BLSTM may be the probability for the different labels to belong to a word. CRF may be used for considering adjacent words and their labels in the determination of labels.

The set of labeled words may comprise one word. Alternatively, or in combination, the set of labeled words may comprise two or more words.

The feature engineering may further comprise a Word Level Case Features and/or a Word Level Lexicon. The Word Level Case Features may be configured to find word-properties in the summary. The Word Level Lexicon may be configured to find features based on domain knowledge.

The step of forming the input may further comprise combining outputs of the Word Level Case Features and the Word Level Lexicon. The outputs of the Word Level Case Features and the Word Level Lexicon may be combined with the outputs of the Word Level Embeddings and the Character Level Embeddings in order to form the input.

The Word Level Lexicon may be constructed from a set of CVEs from the VD, comprising known products, vendors and product and vendors.

The step of building the at least one synthetic CPE based on the extracted information may further comprise combining the extracted information into a predetermined CPE format.

The predetermined CPE format should be understood as being a format where the extracted information may be added, maintaining a machine-readable format.

According to a second aspect, a method for building a database of a plurality of CVEs linked with at least one synthetic CPE is provided. The method comprising the steps of:
  linking each CVE of the plurality of CVEs to at least one synthetic CPE according to the method of the first aspect, and
  storing each CVE of the plurality of CVEs linked with at least one synthetic CPE in the database.

According to one non-limiting example, the database may be a synthetic CPE database as will be discussed in connection with FIG. 16. The synthetic CPEs of the database may be compared to a file CPE in order to find vulnerabilities in software. The file CPE may comprise vendor, product and version in imported software.

According to a third aspect it is provided a method for training of an NLP model, wherein the NLP model is configured to be used for linking a common vulnerability and exposure, CVE, with at least one synthetic common platform enumeration, CPE, the method comprising
  forming a data set, wherein the data set comprises CVEs with linked CPEs received from a vulnerability database, VD;
  dividing the data set into a training set and a validation set;
  fitting parameters of the model by applying the model to CVEs with already linked CPEs in the training set, and optimizing, which may also be referred to as validating, the NLP model using the CVEs in the validation set.

According to a fourth aspect it is provided a server configured to link a common vulnerability and exposure, CVE, with at least one synthetic common platform enumeration, CPE, wherein the CVE comprises a summary of a vulnerability, the server comprising:
- a transceiver configured to:
  - receive the summary of the CVE from a vulnerability database, VD;
- a control circuit configured to execute:
  - an extracting function configured to extract information from the summary of the CVE using an NLP model;
  - a building function configured to build at least one synthetic CPE based on the extracted information; and
  - a linking function configured to link the CVE with the at least one synthetic CPE.

The extracted information may comprise a product and/or a version and/or vendor affected by the vulnerability.

Still other objectives, features, aspects and advantages of the invention will appear from the following detailed description as well as from the drawings. The same features and advantages described with respect to one aspect are applicable to the other aspects unless explicitly stated otherwise.

BRIEF DESCRIPTION OF THE DRAWINGS

Embodiments of the invention will now be described, by way of example, with reference to the accompanying schematic drawings, in which

FIG. 4 is a table of the different case-features with their properties.

FIG. 5 is a table of the number of entries in the security lexicon.

FIG. 8 is a table of the hyperparameters search space and parameters used for best result.

FIG. 9 is a table of the results of the four training cases.

FIG. 10 is a table of the granular test results from model with case features and without lexicon. Scores are over each possible label for the model. Label Count describes how many instances of that particular label is present in the test-set, and Prediction Count describes how many predictions the model produces for a particular label.

DETAILED DESCRIPTION

Vulnerability Data

Figure 1:
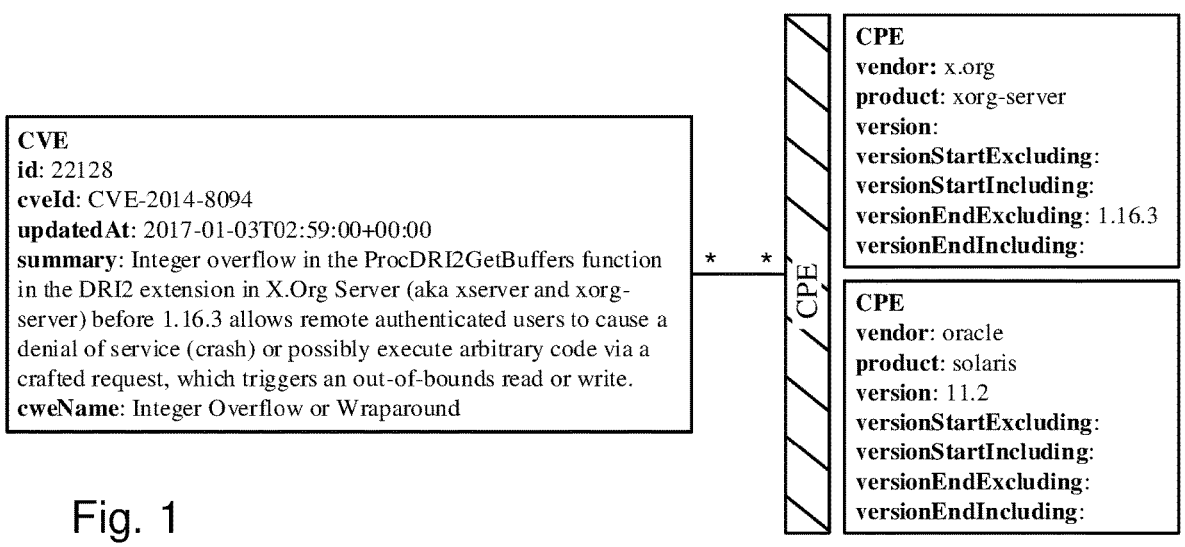
FIG. 1 is an overview of the relationship between a CVE and multiple CPEs.

A new vulnerability is often reported as a common vulnerability and exposure, CVE. A list of CVEs is maintained by Mitre and each entry may comprise a unique CVE number, a short summary, and at least one external reference [20]. The CVE summary typically includes the affected product and versions. An example of the ShellShock CVE-2014-6271 is given below.

GNU Bash through 4.3 processes trailing strings after function definitions in the values of environmental variables, which allows remote attackers to execute arbitrary code via a crafted environment, as demonstrated by vectors involving the ForceCommand features in OpenSSH sshd, the mod_ci and mod_cgid modules in the Apache HTTP Server, scripts executed by unspecified DHCP clients, and other situations in which setting the environment occurs across a privilege boundary from Bash execution, aka "ShellShock".

This information is then used by NVD, adding, among other things, a Common Vulnerability Scoring System, CVSS, score, and a list of common platform enumerations, CPEs. The CVSS score provided by National Institute of Standards and Technology, NIST, is environment independent, but useful when assessing the severity of the vulnerability. The CPE may provide a standardized string for defining which product and versions are affected by the vulnerability.

The current version of CPE is 2.3. The format is specified in [14], and is given by the string cpe:2.3:partvendorproduct:version:update:edition:language:sw_edition:target_sw:target_hw:other The first part defines that it is a CPE and its version. Then, part can be one of h for hardware, a for application and o for operating system. The following fields are used to uniquely specify the component by as non-limiting examples defining vendor, the name of the product, the product version. It is common to use the fields up to and including version, even though, as can be seen, further details about the component can be defined. A non-limiting example, as can be found in CVE-2014-6271, is given by cpe:2.3:a:gnu:bash:4.3:*:*:*:*:*:*:*

NVD may also provide a JSON feed with CVE data for each vulnerability. This feed supports additional fields for defining ranges of versions that are vulnerable. This feed provides a more efficient representation if there are many versions affected. This feed is further detailed in the section Data and Labels.

NVD comprises of around 130 000 vulnerabilities (early 2020). The summary is given immediately when the CVE is published since it is required by Mitre, while the CPE is later added by NVD. The discrepancy differs between different CVEs, but an analysis in [4] reported that, in 2018, the median to correctly assign CPE data was 35 days.

Natural Language Processing and Named Entity Recognition

Natural Language Processing (NLP) is the task to make computers understand linguistics, usually with the support of machine learning. Within NLP, tasks such as machine translation, document classification, question answering systems, automatic summary generation, and speech recognition are common [10]. One advantage of using machine learning for NLP is that the algorithms may gain a contextual semantic understanding of text where classifications are not dependent on a single word, but rather a complex sequence of words that can completely alter the meaning of the document. This may be beneficial to our system, as synthetic CPEs that have not been seen before in the NVD database may be correctly classified from the CVE-summary through a contextual understanding of the document.

Named Entity Recognition (NER), or sequence labeling, is the NLP task of classifying each word in a sequence. One of the most common benchmarks in NER is the CoNLL-2003 dataset [21], where the task is to label words with either person-, organization-, or location-names. NER is an important task within NLP, as a system needs to understand what category a word or sub-sequence belongs to truly understand the contextual meaning of the document.

Data and Labels

To successfully create machine learning models, it is necessary to collect data to train it. The goal for the model is to learn the general underlying structure of the problem through training on that data, which acts as a representation of that problem. This data is referred to as the dataset. Our dataset consists of historical vulnerabilities with already determined CPEs. These can be retrieved using the NVD data feed. Each entry in the dataset have the following features:

cveId: The unique identifier and name for each CVE.
updatedAt: The date and time of the last update from NVD for this particular CVE.
summary: A text description of the CVE, often naming the vulnerable software, including product, vendor, and version.
cweName: The Common Weakness Enumerator.
cpes: A list of CPEs linked to this particular CVE. Each CPE contains:
vendor: The vendor of the product or software.
product: Name of the software.
version: An exact statement of a single vulnerable version.
versionStartExcluding: All versions are vulnerable after (excluding) this version.
versionStartIncluding: All versions are vulnerable after (including) this version.
versionEndExcluding: All versions are vulnerable before (excluding) this version.
versionEndIncluding: All versions are vulnerable before (including) this version.

The analysis concludes that 81.9% of all CPEs from CVEs in NVD only specifies one of the following fields: version, versionStartExcluding, versionStartIncluding, versionEndExcluding, and versionEndIncluding. About 14.5% have no version range specified, and 3.6% have exactly two version ranges specified. FIG. 1 illustrates how a CVE-CPE link can be structured.

As seen in FIG. 1, some of the product and vendor strings can be found in the summary. The version can also be found in the summary but is dependent on the context of the summary to determine if other versions are vulnerable (in this case all versions before version 1.16.3). In this disclosure, only the summary is regarded as input features, the CPE-list as the labels, and all other data is disregarded in the model. Naturally, all CPEs may not be possible to link to the summary through text models as there is no occurrence of the product or vendor in the paragraph. In the analysis, about 59% of CPEs can be mapped with regex methods to its CVE summary, and for 27% of the CVEs, all corresponding CPEs can be mapped to its summary. This is shown in FIG. 1, as Oracle Solaris is not mentioned in the paragraph, but is considered vulnerable from the context that X.org xorg-server is vulnerable.

Figure 2:
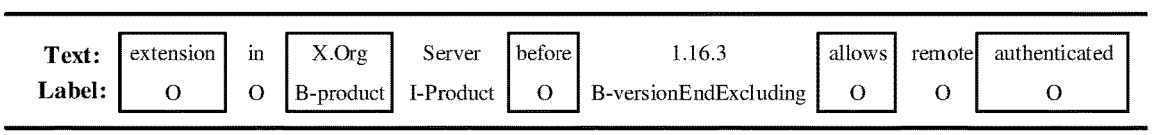
FIG. 2 is an example of a labeled sentence.

A sequence word labeling model requires a label for each word in the sentence. There are eight labels to consider in the CPEs provided by NVD: vendor, product, version, versionStartExcluding, versionStartIncluding, versionEndExcluding, verisonEndIncluding, and O (which denotes the none-label). Some vendors or products consist of multiple words, which need to be accurately predicted by the model. To denote this, labels are split into B- and I-labels where B denotes a start of a label, and I denote the word following the previous B or I labeled words. A part of an example sentence, taken from the CVE summary in FIG. 1, can be seen in FIG. 2.

Problem Statement and Evaluation

The high-level problem that may be solved is one of determining what software and what versions are described in a document. This could be limited to mapping each document to already existing CPEs in the available CPE-list [16]. However, this is not disclosed in this disclosure because the available CPE-list is deficient as it is lacking entries for many products. Analyzing all available CPEs mentioned in CVEs, about 60% of those are only mentioned once. Thus, the probability of a syntehic CVE describing a synthetic, none existent, CPE is high. Therefore, the system of this disclosure is allowed to create synthetic CPEs, in terms of finding software that has not been mentioned in any existing CPE list yet. A completely successful NER-predicted CVE-summary from our test-data will let us reconstruct all corresponding CPEs correctly, while the model may create synthetic CPEs on new CVE-summaries.

To determine success, the system may be measured as a conventional NER-model as following. Over each predicted sequence, the precision was calculated, $$\text{precision} = \frac{\sum \text{true\_positive}}{\sum \text{true\_positive} + \sum \text{false\_positive}}, \quad (1)$$

as well as the recall, $$\text{recall} = \frac{\sum \text{true\_positive}}{\sum \text{true\_positive} + \sum \text{false\_negative}}, \quad (2)$$

and the harmonic mean F1, $$F1 = 2 \cdot \frac{\text{precision} \cdot \text{recall}}{\text{precision} + \text{recall}}. \quad (3)$$

Every correctly predicted O-label from the measurements was removed, as it greatly inflates the result. The overall accuracy of the model as the number of completely correctly NER-predicted CVE-summaries divided by the total number of summaries in that particular dataset may also be measured. A hold-out strategy was implemented to measure these metrics, with a training set to train the model on, a validation set to optimize the model during development, and a testing set to test the final result.

Modeling

In this section, the feature engineering and machine learning model is described. The model is inspired by the work of [2] and [12] in the context of generic NER, where the contribution was to feed the text-data into multiple input sequences to capture different levels of semantics in the text. In brief, words are converted to vector representations [13] to embed contextual semantic meaning in its vector values. Additional word level and character level features are engineered to capture variations, such as word level numerical saturation, casing, and commonly used CPE-products and -vendors. These features are fed into a recurrent Bidirectional Long Short-term Memory (BLSTM) network to perform sequence labeling. Dropout [19] is used to regularize the model after concatenated embeddings, after the recurrent layer, and within the case-feature layer. This model was chosen as it presented a superior performance on the specific task of CPE-labeling compared to other common architectures, such as BERT [3]. The model is also suitable, as domain knowledge can easily be embedded through feature engineering. An overview of the architecture is presented in FIG. 3.

Feature Engineering

Figure 3:
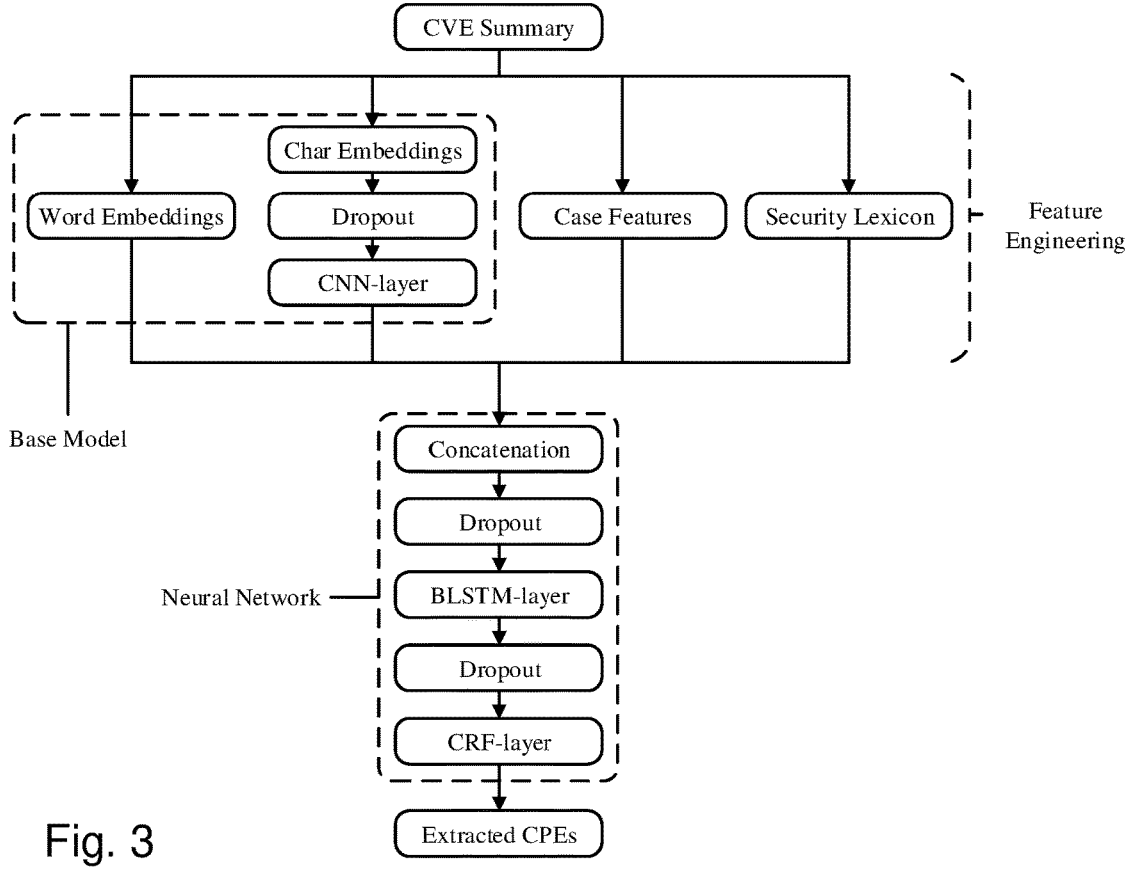
FIG. 3 is an overview of the model architecture and data pipeline.

This subsection will discuss the four parallel input layers used in the feature engineering part of our model as seen in FIG. 3. These are word level embeddings, character level embeddings, word level case-features, and a word level lexicon of known statements. The word and character level embeddings are regarded as part of the base model, and case and lexicon features are regarded as optional/experimental features to the model. The output features are concatenated into an information rich sequential matrix that is fed into a neural network.

Word Level Embeddings

Each word is transformed into a 50, 100, 200, or 300 dimensional numerical vector to represent the semantics of that word with Glove embeddings [18]. These embeddings are pre-trained on a large set of Wikipedia articles and consists of a vocabulary of 400 000 words. This language model serves as a good starting point for our experiments, as they are well documented and tested, which enables us to look into other variables in the modeling. These embeddings are not tuned during training and missing words from the vocabulary are assigned a default randomly generated vector.

Character Level Features

To extract character level features for each word, a three-stage process of embedding on character level was employed, applying a one-dimensional convolution (CNN-layer), and extracting the final word-features with a max-pooling layer. The embeddings are randomly initialized and tuned during training. Dropout is applied to prevent the model from overfitting. The employed CNN-layer has a filter-size of 30 and a kernel-size of 3. A max-operation is done over each filter, so each word outputs a character-feature vector of shape (1, 30), and for the whole word-sequence a shape of (word-sequence-length, 30). Character level features enable the model to learn new words through decoding of character-sequences, and can thereby give similar output-values to insignificant variations of very similar character sequences. As our text-domain (security) is quite different from the pre-trained word level embeddings (Wikipedia), the character level embeddings enable our model to learn security-related semantics.

Word Level Case Features

In the task to find versions, products, and vendors, casing and other word-properties may be important to determine the label of that particular word. For instance, it is common that products' and vendors' names are capitalized. The version label contains a high concentration of character level digits, but may also contain mid-word punctuation and special characters. FIG. 4 shows the different case-features, which are fed into random-uniformly initialized trainable embeddings with the same dimension as the number of cases.

Security Lexicon

Figure 6:
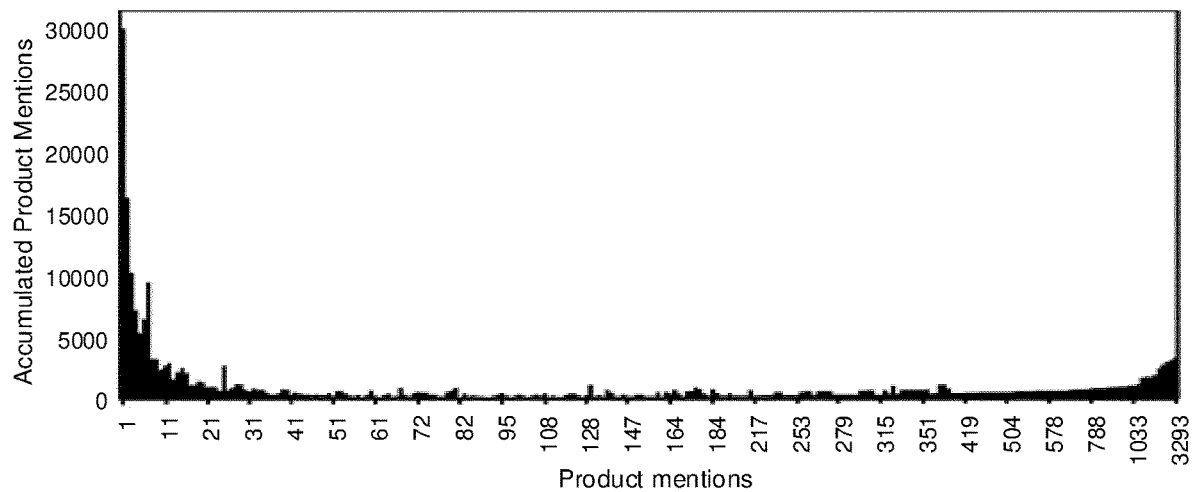
FIG. 6 illustrates the accumulated mentions of product over the number of mentions of a product. The X-axis denotes the number of mentions of individual CPE-product and the Y-axis denotes the number of accumulated mentions of products with X-mentions. The mean of the distribution is 4.69 mentions per product and the median is one mention per product.

To embed domain knowledge into the system, a security-lexicon is built. The labels product and vendor are included in the lexicon features. The lexicon is constructed from the complete set of CVEs from the NVD database consisting of about 130 000 vulnerabilities describing about 50 000 different products, excluding all CVEs in the validation and test dataset. Each entry into the lexicon can describe one of three entities, product, vendor, and product and vendor. Some product/vendor names exist both as products and vendors, which explains this separate feature. The total number of entries in the lexicon can be seen in FIG. 5. When constructing the security lexicon, only common CPE-products and -vendors are added to the lexicon. The cutoff was set to the top 80% of the most common products and vendors to avoid CPEs with very few mentions. As seen in FIG. 6, the accumulated product mentions are heavily skewed towards products with very few mentions. This distribution may discourage the use of a lexicon-feature and increase the importance of case-features and contextual understanding of the model, as the probability of new CVE-summaries containing already existing CPEs has historically been low.

Neural Network

The input layer of the model consists of some or all features described in the section Feature Engineering. The outputs of these features are all considered as embeddings that can be concatenated into a high-dimensional feature-map considering multiple characteristics of the input sequence. These concatenated embeddings are then fed into a neural network for sequence classification. The network architecture is inspired by [12], where the embeddings are fed into a Bidirectional Long Short-term Memory (BLSTM) layer and labels are decoded in a Conditional Random Field (CRF).

Bi-Directional Long Short-Term Memory Unit (BLSTM)

The LSTM [7] neural network unit is a type of recurrent layer that has theoretically strong capabilities to capture long-distance dependencies in sequential data. In text-data, recurrent models are capable of capturing contextual semantics in the data, and correctly model the sequential variations and dependencies of that text data. Conventional recurrent units suffer from problems such as the vanishing and exploding gradient [1,17] which disables these networks to be effective on some tasks. The LSTM unit handles these complications by an internal architecture consisting of an input gate, output gate, forget gate, and a cell state. An overview of the LSTM cell can be seen in FIG. 7.

Figure 7:
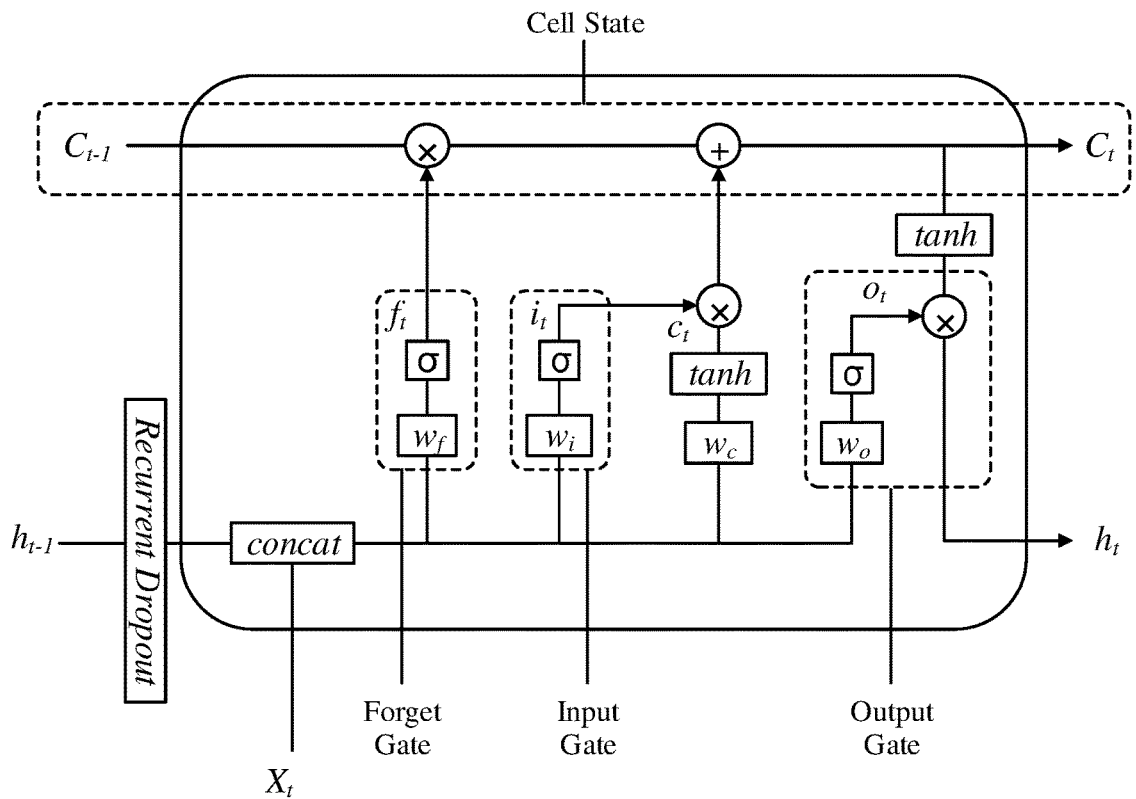
FIG. 7 illustrates a Long Short Term Memory cell. The input gate, output gate, forget gate, and cell state are marked in dotted lines.

In FIG. 7, $X_t$ denotes the t:th embedded input word to the LSTM cell and h represents the hidden state. The variable $h_{t-1}$ is the output from the previous LSTM cell and $h_t$ serves as the output prediction from this LSTM cell for the t:th word in the sequence. C denotes the cell state, which passes the memories of the already processed sequence to the LSTM cell. The forget gate is a nested neural network with a sigmoid activation function that scales the previous hidden state sequence between 0 and 1, where a low output value for a particular part of the sequence denotes that that word should be forgotten. The output from the forget gate $f_t$ is derived through, $$f_t = \sigma(W_f \times \text{concat}(h_{t-1}, X_t) + b_f) \quad (4)$$

where $W_f$ and $b_f$ are the trainable weights. The activation function $\sigma$ is derived through, $$\sigma(x) = \frac{1}{1+e^{-x}}. \quad (5)$$

The input gate values are derived similar to Equation (4), $$i_t = \sigma(W_i \times \text{concat}(h_{t-1}, W_t) + b_i), \quad (6)$$

where $W_i$ and $b_i$ are trainable weights as well. Similarly to Eq. (4), the sigmoid in Eq. (6) normalizes the input values and previous hidden state between 0 and 1, which corresponds to their relative importance in this particular time step t. This layer is responsible to decide what new data should be added to the cell state. To calculate the cell state, the input and previous hidden state is passed through the following equation, $$\tilde{c}_t = \tanh(W_c \times \text{concat}(h_{t-1}, X_t) + b_c), \quad (7)$$

to calculate the actual information that the input at step t brings. Wc and bc are trainable weights. The tanh function normalizes the input between −1.0 and 1.0 through the following equation, $$\tanh(x) = \frac{e^x - e^{-x}}{e^x + e^{-x}}. \quad (8)$$

The relative importance is calculated for X and h, and applied to the output from Eq. (7), which together with the forget gate forms the cell state through $$C_t = f_t \times C_{t-1} + i_t \times \tilde{c}_t, \quad (9)$$

where $C_{t-1}$ is the previous cell state. To calculate the output from a particular part of the sequence, which corresponds to the hidden state $h_t$, the input $X_t$ and $h_{t-1}$ are passed through an output gate. This gate decides what information should be passed to the next hidden state and output as a sequence prediction. The output gate is derived through $$\tilde{o}_t = \sigma(W_o \times \text{concat}(h_{t-1}, X_t) + b_o), \quad (10)$$

where $W_o$ and $b_o$ are trainable weights and the current hidden state is calculated through, $$h_t = \tilde{o}_t \times \tanh(C_t) \quad (11)$$

The output is passed to the next layer of the model, and is a matrix of shape [batch_size, sequence_length, weight_shape], where the batch_size is the number of parallel input examples fed to the model, sequence_length is length of the sentence, and weight_shape is a user set parameter that decides the number of weights used in the four nested neural networks.

To make this LSTM layer bidirectional [6], one simply use two separate, but identical, LSTM layers that pass over the input sequence in one direction each. The output is then concatenated. The output is regularized with dropout [19].

The reason for using a BLSTM is that an LSTM cell does not know anything about the future sequence t+1, t+2, . . . , which may be contextually valuable. For instance, when classifying a version, a part of the sequence may be "[ . . . ] vulnerable version 1.3.4 and earlier". A BLSTM can capture the semantic meaning of "and earlier", and correctly classifies this as versionEndIncluding.

CRF

As shown in the architectural overview in FIG. 3, the output from the BLSTM is fed to a Conditional Random Field (CRF) [8] layer. The benefits of a CRF layer is statistically correlated label determination when assigning a class to a word in a sequence. For instance, the probability of a word being labeled with I-product increases if the previous word has been labeled with B-product. With CRF, labels are assigned jointly to reflect a final prediction for all entities in the sequence that make sense together. This is done through conditional probabilities and global normalization of a random field model.

Consider the output sequence of the BLSTM-layer h={$h_1$, $h_2$, . . . , $h_i$, . . . , $h_N$}, where $h_i$ denotes the numerical vector output from the BLSTM-layer corresponding to the i:th word from the CVE-summary word sequence of length N. The label sequence y={$y_1$, $y_2$, . . . , $y_i$, . . . $y_N$} denotes each corresponding labels to the CVE-summary word sequence, where $y_i$ denotes the predicted label for the i:th word. Y(h) denotes the universe of all possible labels for h. The conditional random field describes the conditional probability of label $y_i$ in respect to input $h_i$ and surrounding labels $y_{v \neq i} = y_{v \sim i}$, where ~ denotes v as close to i, as $p(y_i | h_i, y_v, v \sim i)$ over all possible label sequences.

To determine the probability, a layer of weights W and biases b are used as $$p(y|h; W, b) = \frac{\prod_{i=1}^{n} \gamma_i(y_{i-1}, y_i, h_i)}{\sum_{y^* \in Y(h)} \prod_{i=1}^{n} \gamma_i(y^*_{i-1}, y^*_i, h_i)}, \quad (12)$$

where, $$\gamma_i(y', y, h_i) = \exp(W_{y',y}^T h_i + b_{y',y}). \quad (13)$$

The weights are trained through gradient descent and the Adam optimizer [11], as the rest of the model. The output of the CRF-layer is decoded from the highest conditional probability over the full sequence and serves as the output of the model.

Results and Discussion

Training

To train the model a dataset of 15190 CVEs from NVD may be used, with an evaluation set of 3798 entries and a test set of 4748 entries. The test and evaluation split was done randomly. Experiments were conducted on whether to do a time-split instead of the dataset to prevent look-ahead bias but resulted in an insignificant performance change. The model was optimized with Bayesian hyperparameter optimization [9] over the following hyperparameters:

The learning rate is a parameter that scales how much each weight should be updated in each gradient descent step [11].

The number of cells in the LSTM-layers determines the size of the weight matrices $W_f$, $W_i$, $W_o$, and $W_o$, and their corresponding biases.

Whether the casing features should be used.

Whether the lexicon features should be used.

The dimension of word level embeddings of pre-trained vectors.

The dimension of character level embeddings of randomly initialized vectors.

The Dropout-rate before and after the BLSTM-layer, and inside the char-features.

The Recurrent dropout-rate in the LSTM-cells which determines the dropout rate of previous hidden state $h_{t-1}$.

The training was performed on NVIDIA TESLA K80 GPU and it took about 4-6 h to train the model once. In total, it took about 30 h to do the full training sweep on 16 K80s for 80 training iterations with different hyperparameter settings. This amounts to about 20 GPU-days. The parameter search space can be seen in FIG. 8. The Adam optimizer [11] was used to update the trainable parameters in the model and early stopping to reduce the risk of overfitting.

Main Results

In FIG. 9 the results are presented for the different model configurations. It is clear that the security lexicon did not provide any significant signal to improve the model. The word level casing feature proved beneficial to the performance with a significant improvement over the base model. The best performance on the test-set was attained without the lexicon features and with casing features with an F-measure of 0.8604, a precision of 0.8571, and a recall of 0.8637. It is also clear that the same model had the best performance on the validation set, but as could be seen in FIG. 9, some indications of overfitting to the training-set as the F-measure, recall, and precision are much higher. This may indicate that additional performance could be gained with more aggressive regularization techniques. The fully combined model had much worse performance on the training set and similar performance on the test and validation set. This may indicate that further training and hyperparameter optimization could increase the performance of this model and enable it to surpass the other options.

Performance Over CPE-Product, -Vendor, and -Version

Figure 11:
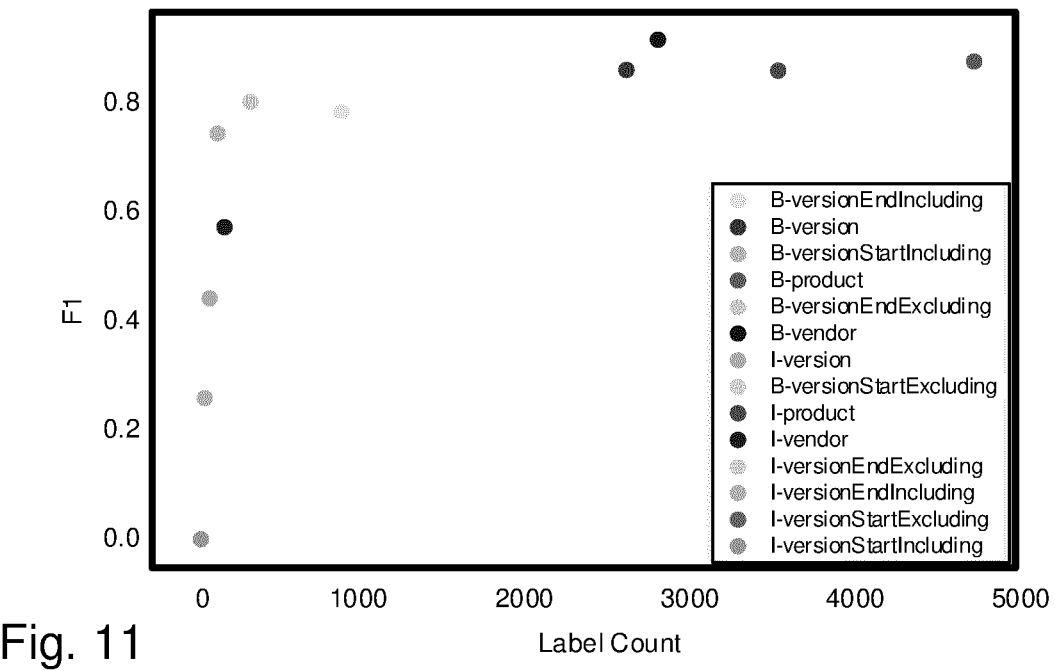
FIG. 11 is a scatter plot over Label Count and F1-score for each class (excluding 'O'). This plot indicates that there seems to be a minimum amount of examples in each class to achieve an F1-score above 0.8 at approximately 300.
Figure 12:
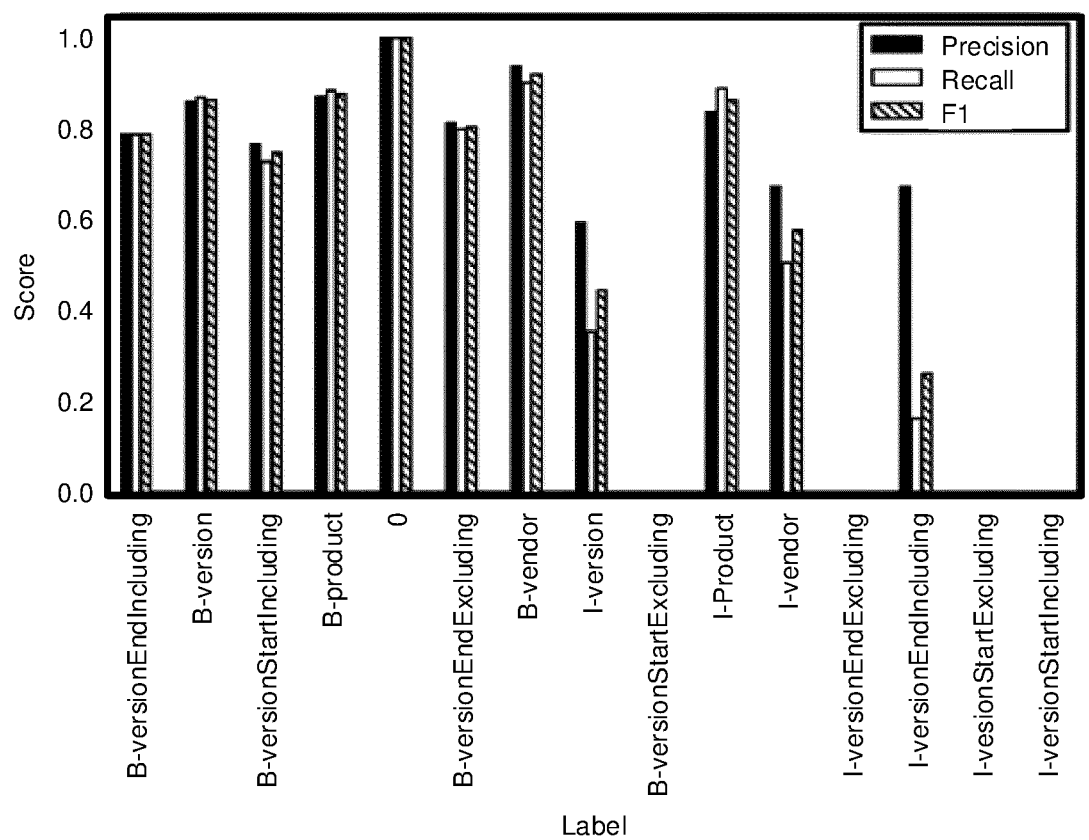
FIG. 12 illustrates Precision, F-measure, and Recall over each possible class for the model with case-features and without lexicon-features.
Figure 13:
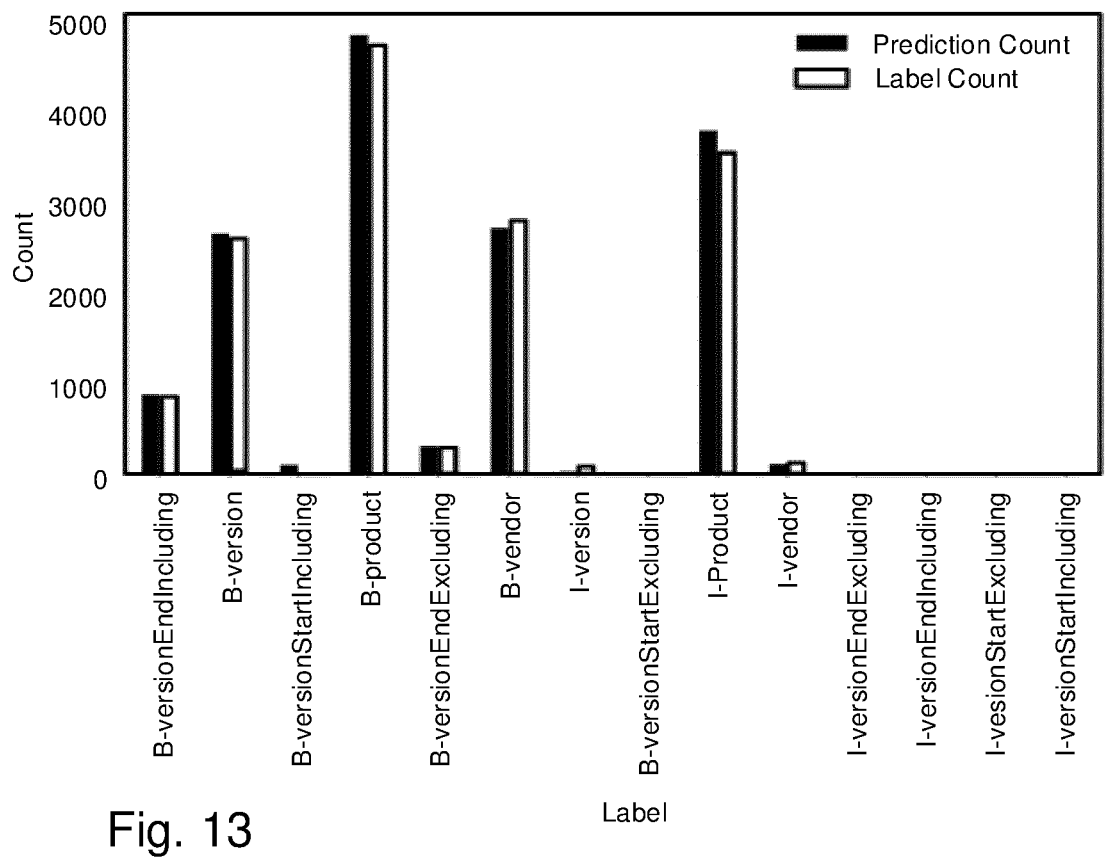
FIG. 13 illustrates Label and Prediction count for each class in the test dataset. Note that the 'O'-label is removed for this visualization.

At a more granular level shown in FIG. 10, the performance of each label on the test-set is illustrated, as well as the number of instances of each label in the test-set Label Count and the number of predicted instances Prediction Count. As seen in FIG. 10, some classes perform better than others. The F-measure is high for B-vendor, B-product, and B-version, as well as I-product. It is clear that there is a correlation between Label Count and all performance scores, which makes sense for this type of model as neural networks tend to be very data-hungry. In FIG. 11 labels with more examples in the dataset clearly have higher performance than less common labels. There seems to be a cutoff at approximately 300 examples to have an F-measure above 0.8. It is further illustrated that the performance for word combinations. are worse, as the scores for I-labels are lower. To further increase the performance on I-labeled entries, it may be beneficial to create n-grams features in the lexicon or collect additional data for those particular cases. FIG. 12 visualizes the results from FIG. 10. The model achieves a similar distribution over each label, which is visualized in FIG. 13.

Feature Analysis

The lexicon features did not provide any significant performance gains together with or compared to the case-features. It is possible that the case features better captured characteristics of the vendor and product labels since those are commonly capitalized in some manner, rather than over-relying on a fairly static memory of common labels. This result is in line with the distribution of products shown in FIG. 6, as 60% of all products NVD are mentioned only once. Other papers, such as [4] and [5] use keyword-based systems or features targeting narrow properties of the vendor- and product label. These systems are not taking the context of the sequence into consideration when performing classification. Thus, by using the present disclosure, the achieved results may be significantly better compared to system and features disclosed in [4] and [5]. With a contextually aware classification, the disclosed system is able to find CPEs that have never been seen before by NVD in any CVEs. This is highly desirable in a system to automatically extract CPEs from CVEs due to the distribution in FIG. 6.

Increase Performance on Rare Labels

The disclosed dataset consists of about roughly 20% of all available CVEs in NVD, which may limit the results. This particular subset was chosen as over 90% of all CPE-version, -product, and -vendor strings for all CPEs paired with a CVE could be found in the summary through regular expression. Stronger regular expressions could increase the number of training examples, and further increase the performance of the system. To increase the performance in the more challenging task of classifying multi-word labels, an overweight to these cases could be provided to the training data, or the model could be pre-trained on a larger high-quality data set such as CoNLL 2003 [21].

Error Analysis

Figure 14:
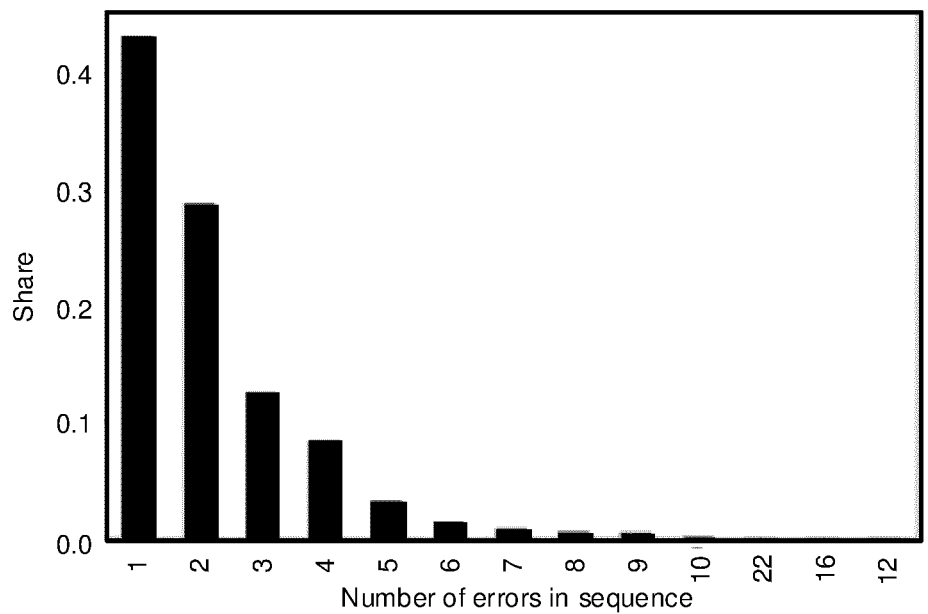
FIG. 14 shows the distribution of number of miss-classifications in a sequence over all miss-classifications.
Figure 15:
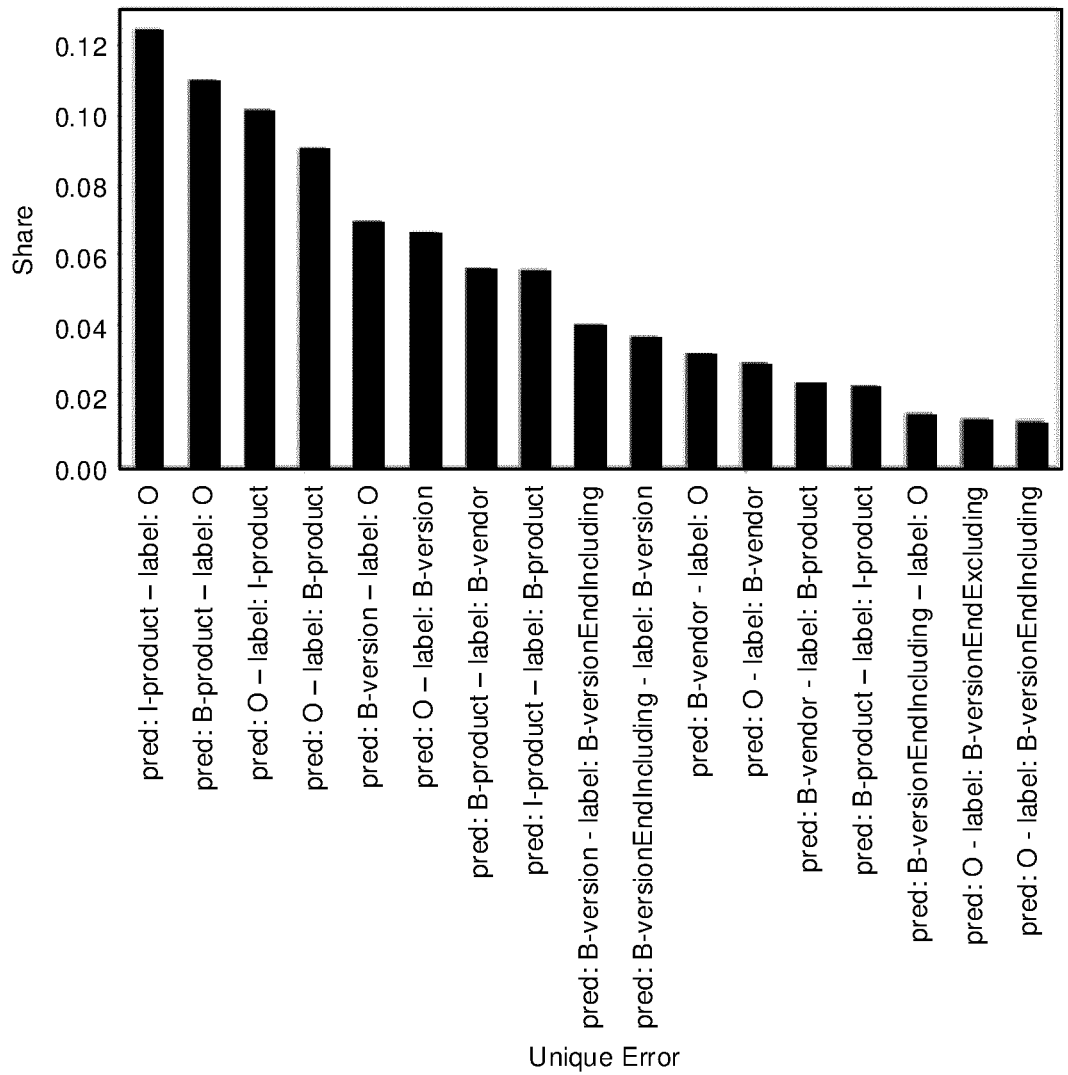
FIG. 15 shows common miss-classifications made by the system. This explains about 90% of the error.

The overall accuracy of the system of correctly linking every CPE of each CVE is 0.6744, measured as the full CVE-summary being correctly NER-annotated by the system. If the system only regards pursuing vendor and product classification, the accuracy would increase to 0.7772, which is more comparable to earlier research as they do not always search for version ranges in the summary. The distribution of the number of errors in all sequences that were incorrect is visualized in FIG. 14, where the accumulated error for sequences with up to 3 errors stands for about 80% of the miss-classified summaries. Looking further into what types of errors the model makes, FIG. 15 visualizes in total about 90% of all miss-classifications. In the top four spots, regarding about 40% of the error are bad predictions on the product label, with the I-label scoring higher than the B-label. This strengthens the hypothesis that the system needs improvement to better find word combinations. The top two mistakes contribute to a lower precision, as it incorrectly finds a CPE-product where there is none, and error three and four contributes to a lower recall as products are miss-classified as a O-words.

Related Research

Other research has tried more extensive engineering of text-features to extract CPEs from the CVE-summary published by NVD. In [5] the authors mine the target product, vendor, and version from the summary by tokenization of each word much like our case-feature and lexicon-feature to discover punctuation, capitalization, and commonly used vendors/products. They also generate snippets (sequence of tokens) to cover multi-word labels through engineered rules based on the feature vector. Multiple token-sequences can then be grouped into a CPE (vendor-product-version link)

based on rules, such as that all version tokens that are within 6 tokens of a product token are assigned to that product token. The context of each version is analyzed to determine the version type (before/after, including/excluding). The authors achieve an F-measure of 0.70 (precision: 0.71, recall: 0.69), which the disclosure significantly outperforms as the disclosure attain an F-measure of 0.86 (precision: 0.857, recall: 0.864).

A similar system of finding CPEs to "one day"-vulnerabilities was proposed in [4], where the authors use a key-word based technique with TF-IDF to find the probability of each word being assigned to a certain sub-class within a CPE. The output of the model is an ordered list of words with a high probability of being a relevant word in a CPE. The authors results may not be comparable to this research, as their system is not intended for automated use and needs explainability. Although, to make a fair comparison, their results of the precision of the top predicted word in each ordered list, which is just below 0.6, can be compared to this disclosure, which is 0.857. Still, their research indicates that a TF-IDF implementation of a lexicon feature could provide additional performance to our system in terms of finding already mentioned products and vendors.

The model is largely based upon [12], which combined engineered features, a BLSTM-network and a CRF-layer to perform NER on the CoNLL 2003 [21] dataset. They achieve an F-measure score as high as 0.9121, which to our knowledge held the state-of-the-art during some time in 2016. Results from different datasets are not comparable, as the quality and the general challenge of each dataset may be different. Other, more recent, implementations of state-of-the-art NLP-models were implemented in our research such as BERT [3], but with a significant decrease in performance compared to our model.

Conclusion

The present disclosure concludes that it is possible to make the process of linking CVEs with CPEs more effective by machine learning with high precision and recall, in regards to the CPEs that are actually mentioned in the CVE-summary. This model is able to find CPE-products, -vendors, and -versions with an F-measure 0.8604 (precision: 0.8571, recall: 0.8637) through NER-tagging, and completely reconstruct all corresponding CPEs in 67.44% of CVE-summaries. This system enables DVM-tools to automatically and without time-lag get an estimate of some CPEs a particular CVE describes and thereby reduce the risk of becoming a victim of a "one day"-vulnerability. Additionally, CPEs may also be found in incorrectly labeled CVEs or from vulnerabilities from other sources, such as forums, email-threads, or RSS-feeds. These results may establish a synthetic state-of-the-art in extracting CPEs from CVE-summaries.

The system could be further developed by embedding knowledge of the available universe of CPEs into the results of the prediction so that each estimated CPE could be pared to one or multiple existing CPEs. A TF-IDF or n-grams implementation of the security lexicon feature, as in [4], could also improve the performance of the system, possibly also taking advantage of a security-lexicon, which in our case brings no noteworthy additional performance.

System for Identifying Vulnerabilities in Software

Figure 16:
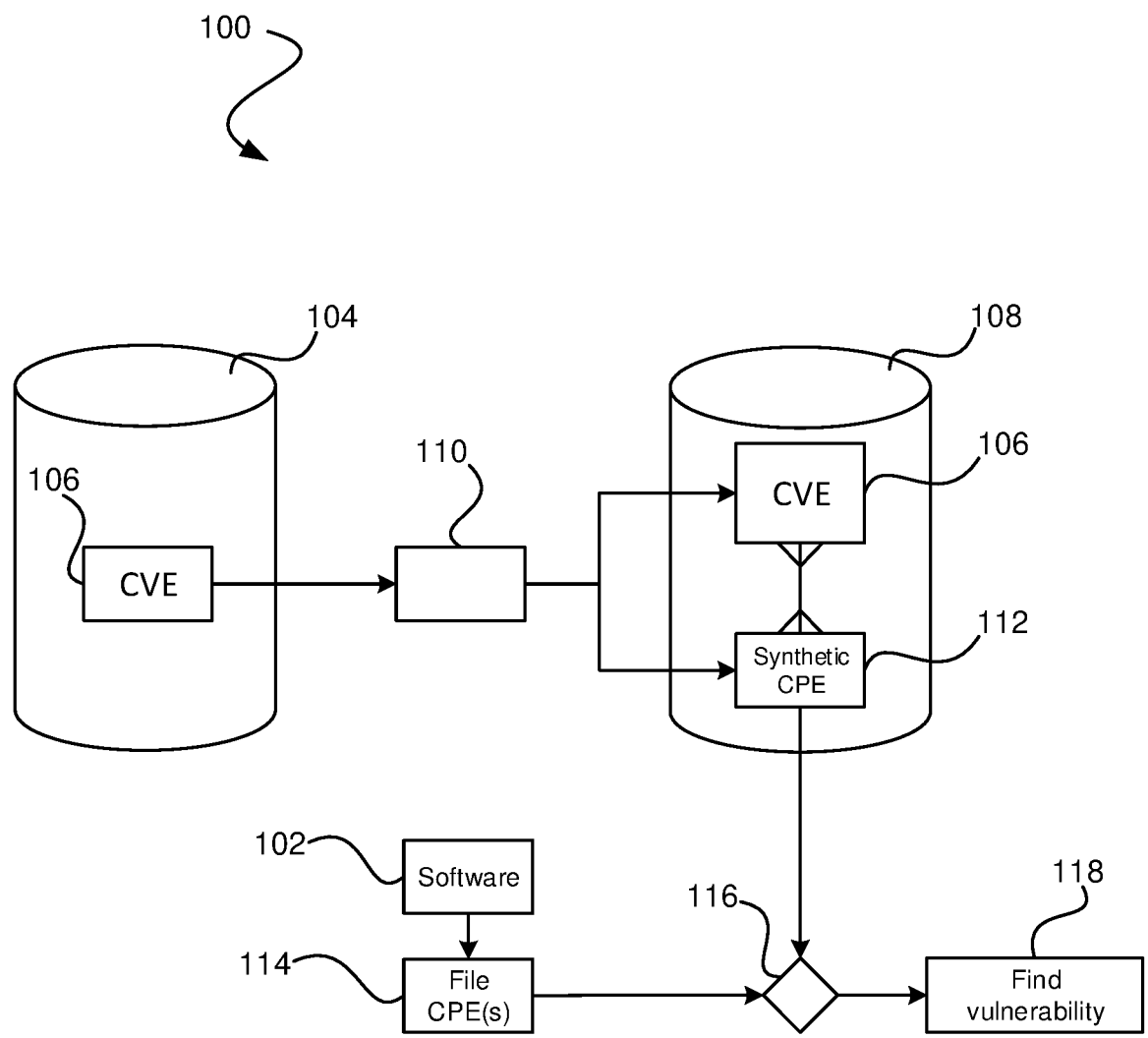
FIG. 16 illustrates a system for identifying vulnerabilities in software.

FIG. 16 illustrates a system 100 for identifying vulnerabilities in software 102. The system 100 comprises a vulnerability database 104. The vulnerability database 104 provides a plurality of common vulnerability and exposures, CVEs 106. Each CVE 106 of the plurality of CVEs may comprise a summary describing a vulnerability. The system 100 further comprises a synthetic common platform enumeration, CPE, database 108. The synthetic CPE database 108 can be constructed 110 by using a method 400 for building the database of the plurality of CVEs as will be further discussed in connection with FIG. 19. 19. The plurality of CVEs 106 can be retrieved from the vulnerability database 104. The synthetic CPE database 108 comprises linked CVEs 106, wherein the linked CVEs 106 are linked with synthetic CPEs 112. The linked CVEs 106 can be linked to a plurality of synthetic CPEs 112 and vice versa.

A software 102 to be investigated for vulnerabilities can be described by at least one File CPE 114. The File CPE(s) 114 can then be compared 116 to the synthetic CPEs 112 of the synthetic CPE database 108, in order to find if there are any matching synthetic CPEs 112 that link to known CVEs 106 representing vulnerabilities 118.

Server Configured to Link a CVE with at Least One Synthetic CPE

Figure 17:
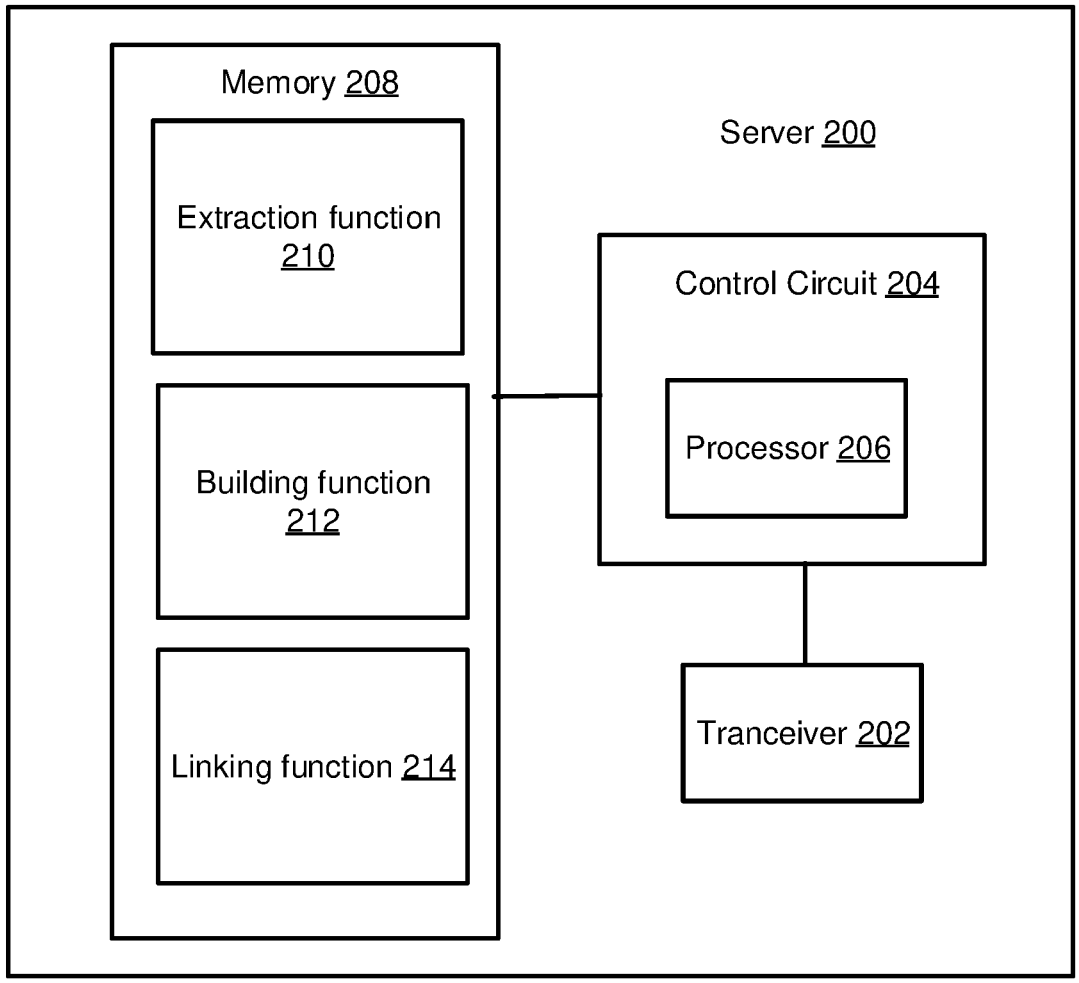
FIG. 17 illustrates a server configured to link a common vulnerability and exposure, CVE, with at least one synthetic common platform enumeration, CPE.

FIG. 17 illustrates a schematic view of a server 200. The server 200 is configured to link a common vulnerability and exposure, CVE, with at least one synthetic common platform enumeration, CPE. The CVE comprises a summary of a vulnerability. The server 200 comprises a transceiver 202, a control circuit 204 and a memory 208.

The transceiver 202 is configured to enable the server 200 to communicate with other devices, such as a vulnerability database, VD. The transceiver 202 may be configured to receive the summary of the CVE from the vulnerability database, VD.

The control circuit 204 may be configured to perform the control of function and operations of the server 200. The control circuit 204 may include a processor 206, such as a central processing unit (CPU). The processor 206 can be configured to execute program code stored in the memory 208, in order to perform functions and operations of the server 200.

The control circuit 204 may execute an extracting function 210. The extracting function 210 can be configured to extract information from the summary of the CVE. The information may be extracted by using a Natural Language Processing, NLP, model. The extracted information may comprise a product and/or version and/or vendor affected by the vulnerability. Extracting the information is discussed in further detail in connection with FIG. 18.

The control circuit 204 may execute a building function 212. The building function 212 can be configured to build at least one synthetic CPE. The synthetic CPE may be built based on the extracted information.

The control circuit 204 may execute a linking function 214. The linking function 214 can be configured to link the CVE with the at least one synthetic CPE.

Method for Linking a CVE With at Least One Synthetic CPE

Figure 18:
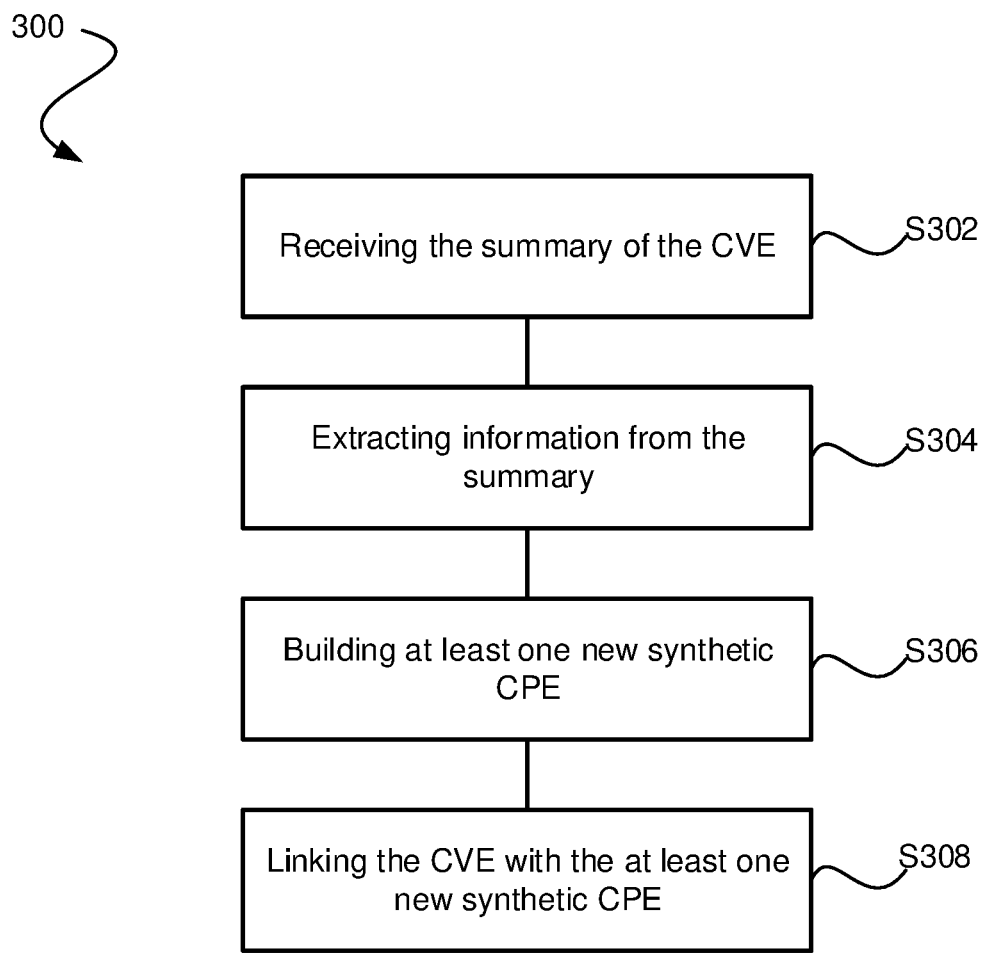
FIG. 18 is a flowchart illustrating a method for linking a common vulnerability and exposure, CVE, with at least one synthetic common platform enumeration, CPE.

FIG. 18 is a flowchart illustrating steps of a method 300 for linking a common vulnerability and exposure, CVE, with at least one synthetic common platform enumeration, CPE, by way of example. The CVE may comprise a summary of a vulnerability.

In a first step S302, the summary of the CVE is received from a vulnerability database, VD.

In a second step S304, information from the summary of the CVE is extracted by using a Natural Language Processing, NLP, model. The information may comprise a vendor and/or a product name and/or a product version that may be affected by the vulnerability.

Optionally, the step of extracting information from the summary of the CVE may comprise adding a label for each word in the summary, wherein the label may be selected from a CPE relevant group or a non-CPE relevant group. The CPE relevant group may comprise vendor, product, version, first excluded version, first included version, last excluded version, last included version. The labels from the CPE relevant group may further be labeled as B-label or I-label. The B-label may denote a labeled word to be a beginning of a word combination. The I-label may denote the labeled word to be placed after the beginning in the word combination. The non-CPE relevant group may comprise none-labels. Thereafter, the words with labels from the CPE relevant group may be extracted from the summary of the CVE.

Optionally, the step of extracting information from the summary of the CVE may comprise feeding each word in the summary of the CVE into a feature engineering. The feature engineering may comprise Word Level Embeddings and Character Level Embeddings. The Word Level Embeddings may be configured to transform each word in the summary into a numerical vector. The Character Level Embeddings may be configured to extract character level features for each word in the summary. Alternatively, or in combination, the feature engineering may further comprise Word Level Case Features. The Word Level Case Features may be configured to find word-properties in the summary. Alternatively, or in combination, the feature engineering may further comprise a Word Level Lexicon. The Word Level Lexicon may be configured to find features based on domain knowledge. The Word Level Lexicon may be constructed from a set of CVEs from the VD, comprising known products, vendors and product and vendors. Thereafter, an input may be formed by combining outputs of the Word Level Embeddings and the Character Level Embeddings. Alternatively, or in combination, the step of forming the input may further comprise combining outputs of the Word Level Case Features and the Word Level Lexicon. Then, the input may be fed into a neural network. The neural network may comprise a recurrent Bidirectional Long Short-term Memory (BLSTM) network and a Conditional Random Field (CRF) layer. Thereafter, a set of labeled words from output of the neural network may be determined.

In a third step S306, at least one synthetic CPE is built based on the extracted information.

In a fourth step S308, the CVE is linked with the at least one synthetic CPE.

Method for Building a Database of a Plurality of CVEs

Figure 19:
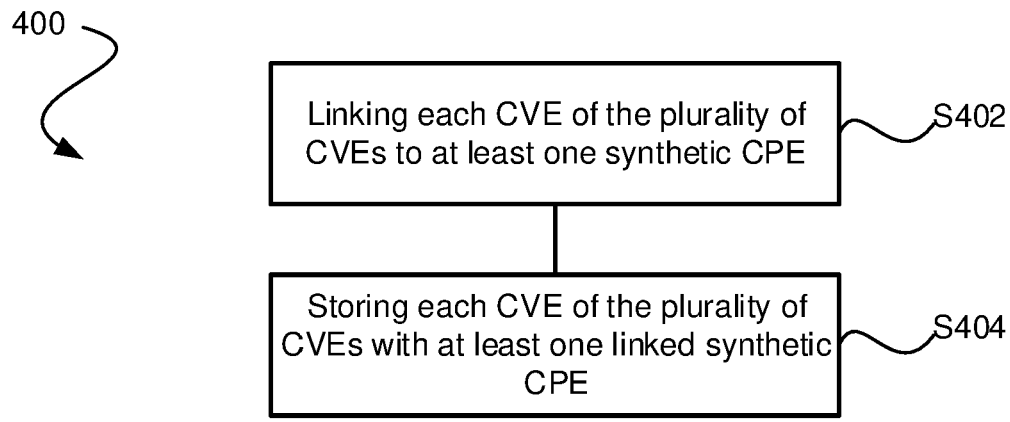
FIG. 19 is a flowchart illustrating a method for building a database pf a plurality of CVEs linked with at least one synthetic CPE.

FIG. 19 is a flowchart illustrating steps of a method 400 for building a database of a plurality of CVEs with at least one linked synthetic CPE. In a first step S402, each CVE of the plurality of CVEs may be linked to at least one synthetic CPE according to the method 300 discussed in connection with FIG. 18. In a second step S404, each CVE of the plurality of CVEs with at least one linked synthetic CPE may be stored in the database.

Optionally, the synthetic CPE of the database may be compared to a file CPE in order to find vulnerabilities in software. The file CPE may comprise vendor, product and version of imported software.

Method for Training of an NLP Model

Figure 20:
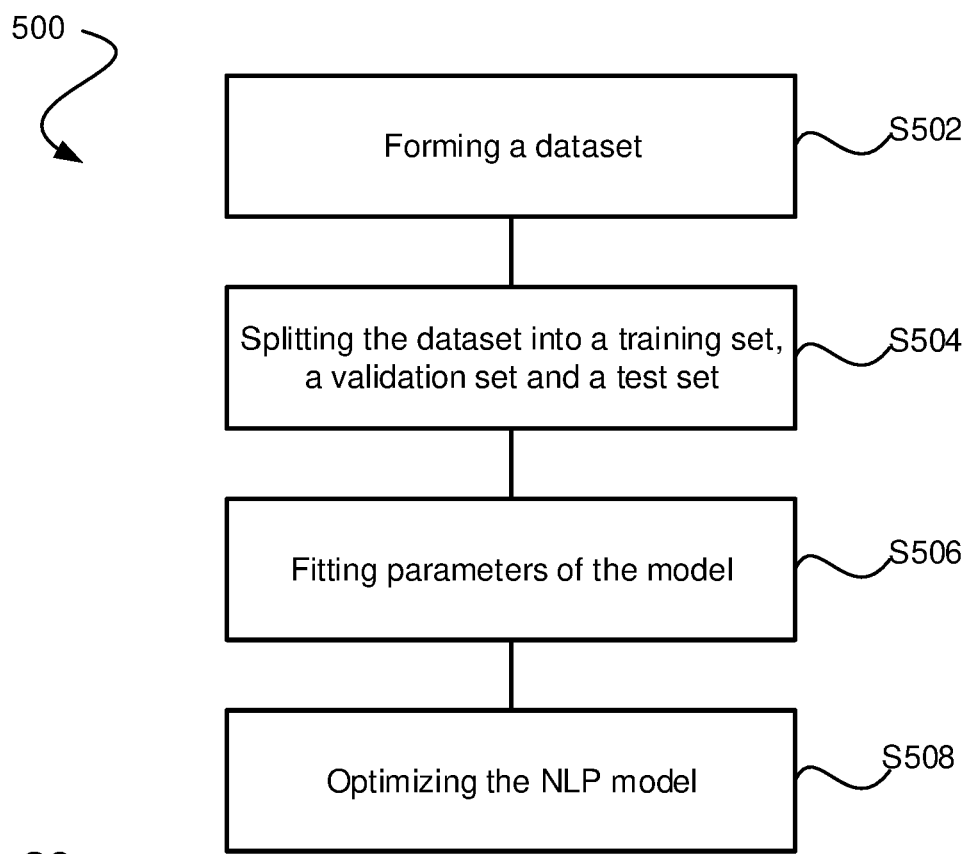
FIG. 20 is a flowchart illustrating a method for training a NLP model.

FIG. 20 is a flowchart illustrating steps of a method 500 for training an NLP model. The NLP model is configured to be used for linking a common vulnerability and exposure, CVE, with at least one common platform enumeration, CPE. In a first step S502, a dataset is formed. The dataset may comprise CVEs with linked CPEs. In a second step S504, the dataset may be divided into a training set and a validation set. In a third step S506, parameters of the model may be fitted by applying the model to CVEs with linked CPEs in the training set. Thereafter, in a fourth step S508, the NLP model may be optimized by using the CVEs in the validation set.

From the description above follows that, although various embodiments of the disclosure have been described and shown, the disclosure is not restricted thereto, but may also be embodied in other ways within the scope of the subject-matter defined in the following claims.

The approach described herein differs from e.g. the approach suggested in US 2019/0147167. US 2019/0147167 A1 is aimed at collecting and classifying formal vulnerability data as well as collecting, classifying, and formalizing informal vulnerability data. Both the formal and informal vulnerability data is collected from structured data sources. Structured in this case can be interpreted as the information being identifiable by tags, such as XLM-tags or HTML-tags. For example, the informal data is collected by HTML parsing. Unlike US 2019/0147167 A1, the approach suggested herein solves the problem of extracting vulnerability data from unstructured data. The vulnerability data in this case is unstructured in the sense that it has not been analyzed or processed in any way. The vulnerability data can be any text describing the vulnerability, from which the NLP model presented in this disclosure is able to analyze and extract the correct information. To do so, the context of the words in the text can be considered. Thus, this is a different task than classifying words in structured data.

Further, the present invention is aimed at building synthetic CPEs, i.e. CPEs that has not yet been seen by anyone and linking them to known CVEs, while US 2019/0147167 A1 is aimed at collecting and formalizing vulnerability data from a number of different sources which are already structured. By building synthetic CPEs, in accordance with the approach suggested herein, and linking them to CVEs, DVM tools which are configured to work with the list of CPEs provided by NVD can be more effective by also using the synthetic CPEs built according to the suggested approach.

BIBLIOGRAPHY

[1] Bengio, Y., Simard, P., Frasconi, P.: Learning long-term dependencies with gradient descent is difficult. IEEE Transactions on Neural Networks 5(2), 157-166 (March 1994)

[2] Chiu, J. P., Nichols, E.: Named Entity Recognition with Bidirectional LSTM-CNNs. Transactions of the Association for Computational Linguistics 4, 357-370 (2016), https://www.aclweb.org/anthology/Q16-1026

[3] Devlin, J., Chang, M., Lee, K., Toutanova, K.: BERT: Pre-training of Deep Bidirectional Transformers for Language Understanding. CoRR abs/1810.04805 (2018), http://arxiv.org/abs/1810.04805

[4] Elbaz, C., Rilling, L., Morin, C.: Automated Keyword Extraction from "One-day" Vulnerabilities at Disclosure. Research Report RR-9299, Inria Rennes—Bretagne Atlantique (November 2019), https://hal.inria.fr/hal-02362062

[5] Glanz, L., Schmidt, S., Wollny, S., Hermann, B.: A Vulnerabilitys Lifetime: Enhancing Version Information in CVE Databases. In: Proceedings of the 15th International Conference on Knowledge Technologies and Data-Driven Business. i-KNOW 15, Association for Computing Machinery, New York, N.Y., USA (2015)

[6] Graves, A., Schmidhuber, J.: Framewise phoneme classification with bidirectional LSTM networks. In: Proceedings. 2005 IEEE International Joint Conference on Neural Networks, 2005. vol. 4, pp. 2047-2052 vol. 4 (July 2005)

[7] Hochreiter, S., Schmidhuber, J.: Long Short-term Memory. Neural computation 9, 1735-80 (December 1997)

[8] John Lafferty, A. M., Pereira, F. C.: Conditional Random Fields: Probabilistic Models for Segmenting and Labeling Sequence Data pp. 282{289 (June 2001)

[9] Kaul, P., Golovin, D., Kochanski, G.: Google Cloud (August 2017), https://cloud.google.com/blog/products/gcp/hyperparameter-tuning-cloud-machine-learning-engine-using-bayesian-optimization

[10] Khurana, D., Koli, A., Khatter, K., Singh, S.: Natural Language Processing: State of The Art, Current Trends and Challenges (August 2017)

[11] Kingma, D., Ba, J.: Adam: A Method for Stochastic Optimization. International Conference on Learning Representations (December 2014)

[12] Ma, X., Hovy, E.: End-to-end Sequence Labeling via Bi-directional LSTM-CNNs-CRF. In: Proceedings of the 54th Annual Meeting of the Association for Computational Linguistics (Volume 1: Long Papers). pp. 1064-1074. Association for Computational Linguistics, Berlin, Germany (August 2016)

[13] Mikolov, T., Chen, K., Corrado, G., Dean, J.: Efficient Estimation of Word Representations in Vector Space. Proceedings of Workshop at ICLR 2013 (January 2013)

[14] NIST, National Institute of Standards and Technology: Common Platform Enumeration: Naming Specification, Version 2.3, NIST Interagency Report 7695 (2011)

[15] NIST, National Institute of Standards and Technology: National Vulnerability Database (2019), https://nvd.nist.gov

[16] NIST, National Institute of Standards and Technology: Official Common Platform Enumeration (CPE) Dictionary (2020), https://nvd.nist.gov/products/cpe

[17] Pascanu, R., Mikolov, T., Bengio, Y.: Understanding the exploding gradient problem. CoRR abs/1211.5063 (2012), http://arxiv.org/abs/1211.5063

[18] Pennington, J., Socher, R., Manning, C.: Glove: Global Vectors forWord Representation. In: Proceedings of the 2014 Conference on Empirical Methods in Natural Language Processing (EMNLP). pp. 1532-1543. Association for Computational Linguistics, Doha, Qatar (October 2014), https://www.aclweb.org/anthology/D14-1162

[19] Srivastava, N., Hinton, G., Krizhevsky, A., Sutskever, I., Salakhutdinov, R.: Dropout: A Simple Way to Prevent Neural Networks from Overfitting. Journal of Machine Learning Research 15, 1929{1958 (2014), http://jmlr.org/papers/v15/srivastava14a.html

[20] The MITRE Corporation: Common Vulnerabilities and Exposures (2019), https://cve.mitre.org

[21] Tjong Kim Sang, E. F., De Meulder, F.: Introduction to the CoNLL-2003 Shared Task: Language-Independent Named Entity Recognition. In: Proceedings of the Seventh Conference on Natural Language Learning at HLT-NAACL 2003—Volume 4. p. 142147. CONLL 03, Association for Computational Linguistics, USA (2003)

The invention claimed is:

1. A method for linking a common vulnerability and exposure, CVE, with at least one synthetic common platform enumeration, CPE, wherein the CVE comprises a CVE summary of a vulnerability and a Common Vulnerability Scoring System, CVSS, score, the method comprising:

receiving the summary of the CVE from a vulnerability database, VD, the CVE summary comprising unstructured data comprising words and characters independent of the words;

extracting from the CVE summary extracted information comprising word level features and transforming each word level feature in the CVE summary to a numerical vector to represent semantics of the corresponding word level feature and form a word level embedding for the corresponding word;

extracting from the CVE summary extracted information comprising character level features and transforming each character level feature into a numerical vector to form a character level embedding for the corresponding character level feature;

concatenating the word level and character level embedding into concatenated embeddings;

providing the concatenated embeddings to a Natural Language Processing, NLP, model to provide NLP output defining a contextual semantic understanding of the extracted information, the contextual semantic understanding comprising a CPE label indicating that the extracted information in the CVE summary is relevant to at least one synthetic CPE different from CPEs in a predetermined list of CPEs;

providing the concatenated embeddings to a Natural Language Processing, NLP, model to define a contextual semantic understanding of the extracted information, the contextual semantic understanding comprising a first CPE label indicating that first extracted information in the CVE summary is relevant to at least one synthetic CPE different from the CPEs in the predetermined list of CPEs and a second CPE label indicating that second extracted information is not relevant to the CPE, wherein the CPE label is selected from a CPE relevant group comprising vendor, product, version, first excluded version, first included version, last excluded version, last included version or a non-CPE relevant group comprising none-labels, extracting words with CPE labels from the CPE relevant group;

building the at least one synthetic CPE based on the first but not the second extracted information, and linking the CVE with the at least one synthetic CPE.

2. The method according to claim 1, wherein the contextual semantic understanding comprises the second CPE relevancy label indicating that the second extracted information is not relevant to the CPE, wherein, in the building, the at least one synthetic CPE is not based on the second extracted information, and wherein the extracted information comprises a vendor and/or product name and/or a product version affected by the vulnerability.

3. The method according to claim 1, wherein the step of extracting information from the summary of the CVE comprises:

adding a CPE label for each word in the summary, wherein the CPE label is selected from a CPE relevant group comprising vendor, product, version, first excluded version, first included version, last excluded version, last included version or a non-CPE relevant group comprising none-labels, and extracting words with CPE labels from the CPE relevant group.

4. The method according to claim 1, further comprising adding a CPE label for each word in the summary, wherein the CPE labels from the CPE relevant group are further labeled as B-label or I-label, wherein the B-label denotes a labeled word to be a beginning of a word combination and the I label denotes the labeled word to be placed after the beginning in the word combination; and analyzing the NLP output by a conditional random field (CRF) layer to provide the extracted information, the CRF layer providing statistically correlated label determination when assigning a class to a word in a sequence.

5. The method according to claim 1, wherein the extracted information comprises a set of CPE labeled words; and further comprising:

extracting from the CVE summary word-level case-features; and extracting from the CVE summary lexicon word level features defined by a word level lexicon based on domain knowledge, wherein the concatenating comprises concatenating the word-level and lexicon word level features into the concatenated embeddings, wherein the NLP comprise a recurrent Bidirectional Long Short-term Memory (BLSTM) network and a Conditional Random Field (CRF) layer.

6. The method according to claim 5, wherein the word-level case features extracting is configured to find word-properties in the summary, and/or a word level lexicon, wherein the word level lexicon is configured to find features based on domain knowledge.

7. The method according to claim 6, wherein the word-level case features are configured to find word properties in the CVE summary.

8. The method according to claim 6, wherein the word level lexicon is constructed from a set of CVEs from the VD, comprising known products, vendors and product and vendors.

9. The method according to claim 1, wherein the step of building the at least one synthetic CPE based on the extracted information further comprises combining the extracted information into a predetermined CPE format.

10. A method for building a database of a plurality of CVEs linked with at least one synthetic CPE, comprising the steps of:

linking each CVE of the plurality of CVEs to at least one synthetic CPE according to the method of claim 1, and storing each CVE of the plurality of CVEs linked with at least one synthetic CPE in the database.

11. The method according to claim 10, for comparing a file CPE, wherein the file CPE comprises vendor, product and version of imported software, with synthetic CPEs of the database to find vulnerabilities in software and wherein the extracted information comprises unstructured data.

12. A server configured to link a common vulnerability and exposure, CVE, with at least one synthetic common platform enumeration, CPE, wherein the CVE comprises a CVE summary of a vulnerability, the server comprising:

a transceiver configured to:
receive the summary of the CVE from a vulnerability database, VD, the CVE summary comprising unstructured data comprising words and characters independent of the words;

a control circuit configured to execute:
an extracting function configured to extract from the CVE summary, as extracted information, word level features and transforming each word level feature in the CVE summary to a numerical vector to represent semantics of the corresponding word level feature and form a word level embedding for the corresponding word, extract from the CVE summary, as extracted information, character level features in the CVE summary and transforming each character level feature into a numerical vector to form a character level embedding for the corresponding character level feature, concatenate the word level and character level embedding into concatenated embeddings, provide the concatenated embeddings to a Natural Language Processing, NLP, model to provide NLP output defining a contextual semantic understanding of the extracted information, the contextual semantic understanding comprising a CPE label indicating that the extracted information in the CVE summary is relevant to at least one synthetic CPE different from CPEs in a predetermined list of CPEs, and provide the concatenated embeddings to a Natural Language Processing, NLP, model to define a contextual semantic understanding of the extracted information, the contextual semantic understanding comprising a first CPE label indicating that first extracted information in the CVE summary is relevant to at least one synthetic CPE different from the CPEs in the predetermined list of CPEs and a second CPE label indicating that second extracted information is not relevant to the CPE, wherein the CPE label is selected from a CPE relevant group comprising vendor, product, version, first excluded version, first included version, last excluded version, last included version or a non-CPE relevant group comprising none-labels, and;

a building function configured to extract words with CPE labels from the CPE relevant group and build the at least one synthetic CPE based on the first but not the second extracted information; and a linking function configured to link the CVE with the at least one synthetic CPE.

13. The server according to claim 12, wherein the contextual semantic understanding comprises the second CPE relevancy label indicating that the second extracted information is not relevant to the CPE, wherein, in the build function, the at least one synthetic CPE is not based on the second extracted information, and wherein the extracted information comprises a product and/or a version and/or vendor affected by the vulnerability.

14. The server according to claim 12, wherein the CVE comprises a Common Vulnerability Scoring System, CVSS, score and wherein the extracting function is configured to:

add a CPE label for each word in the summary, wherein the CPE label is selected from a CPE relevant group comprising vendor, product, version, first excluded version, first included version, last excluded version, last included version or a non-CPE relevant group comprising none-labels, and extract words with CPE labels from the CPE relevant group.

15. The server according to claim 12, wherein the extracting function is configured to add a CPE label for each word in the summary, wherein the CPE labels from the CPE relevant group are further labeled as B-label or I-label, wherein the B-label denotes a labeled word to be a beginning of a word combination and the I label denotes the labeled word to be placed after the beginning in the word combination and analyze the NLP output by a conditional random field (CRF) layer to provide the extracted information, the CRF layer providing statistically correlated label determination when assigning a class to a word in a sequence and wherein the extracted information comprises unstructured data.

16. The server according to claim 12, wherein the extracted information comprises a set of CPE labeled words and wherein the extracting function is configured to:
- extract from the CVE summary word-level case-features; and
- extract from the CVE summary lexicon word level features defined by a word level lexicon based on domain knowledge, and further comprising concatenating the word-level and lexicon word level features into the concatenated embeddings, wherein the NLP comprise a recurrent Bidirectional Long Short-term Memory (BLSTM) network and a Conditional Random Field (CRF) layer.

17. The server according to claim 16, wherein the word-level case features extracting is configured to find word-properties in the summary, and/or a word level lexicon, wherein the word level lexicon is configured to find features based on domain knowledge.

18. The server according to claim 17, wherein the word-level case features are configured to find word properties in the CVE summary and wherein the building function is configured to combine the extracted information into a predetermined CPE format.

19. A method for linking a common vulnerability and exposure, CVE, with at least one synthetic common platform enumeration, CPE, wherein the CVE comprises a CVE summary of a vulnerability, the method comprising:
- receiving the summary of the CVE from a vulnerability database, VD, the CVE summary comprising unstructured data comprising words and characters independent of the words;
- extracting from the CVE summary extracted information comprising word level features and transforming each word level feature in the CVE summary to a numerical vector to represent semantics of the corresponding word level feature and form a word level embedding for the corresponding word;
- extracting from the CVE summary extracted information comprising character level features in the CVE summary and transforming each character level feature into a numerical vector to form a character level embedding for the corresponding character level feature;
- concatenating the word level and character level embedding into concatenated embeddings;
- providing the concatenated embeddings to a Natural Language Processing, NLP, model to provide NLP output defining a contextual semantic understanding of the extracted information, the contextual semantic understanding comprising a CPE label indicating that the extracted information in the CVE summary is relevant to at least one synthetic CPE different from CPEs in a predetermined list of CPEs,
- providing the concatenated embeddings to a Natural Language Processing, NLP, model to define a contextual semantic understanding of the extracted information, the contextual semantic understanding comprising a first CPE label indicating that first extracted information in the CVE summary is relevant to at least one synthetic CPE different from the CPEs in the predetermined list of CPEs and a second CPE label indicating that second extracted information is not relevant to the CPE, wherein the CPE label is selected from a CPE relevant group comprising vendor, product, version, first excluded version, first included version, last excluded version, last included version or a non-CPE relevant group comprising none-labels,
- extracting words with CPE labels from the CPE relevant group,
- building the at least one synthetic CPE based on the first but not the second extracted information, and
- linking the CVE with the at least one synthetic CPE.

20. The method according to claim 19, wherein the extracted information comprises a set of CPE labeled words; and further comprising and wherein the step of extracting information from the summary of the CVE further comprises:
- extracting from the CVE summary word-level case-features; and
- extracting from the CVE summary lexicon word level features defined by a word level lexicon based on domain knowledge, wherein the concatenating comprises concatenating the word-level and lexicon word level features into the concatenated embeddings, wherein the NLP comprise a recurrent Bidirectional Long Short-term Memory (BLSTM) network and a Conditional Random Field (CRF) layer and further comprising:
- adding a CPE label for each word in the summary, wherein the CPE labels from the CPE relevant group are further labeled as B-label or I-label, wherein the B-label denotes a labeled word to be a beginning of a word combination and the I label denotes the labeled word to be placed after the beginning in the word combination; and
- analyzing the NLP output by a conditional random field (CRF) layer to provide the extracted information, the CRF layer providing statistically correlated label determination when assigning a class to a word in a sequence.

* * * * *